(12) United States Patent
Kim et al.

(10) Patent No.: US 8,400,939 B2
(45) Date of Patent: Mar. 19, 2013

(54) METHOD FOR MONITORING CONTROL CHANNEL IN WIRELESS COMMUNICATION SYSTEM

(75) Inventors: So Yeon Kim, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 302 days.

(21) Appl. No.: 12/933,361

(22) PCT Filed: Mar. 19, 2009

(86) PCT No.: PCT/KR2009/001404
§ 371 (c)(1),
(2), (4) Date: Sep. 17, 2010

(87) PCT Pub. No.: WO2009/116816
PCT Pub. Date: Sep. 24, 2009

(65) Prior Publication Data
US 2011/0038275 A1    Feb. 17, 2011

Related U.S. Application Data

(60) Provisional application No. 61/038,056, filed on Mar. 20, 2008, provisional application No. 61/038,415, filed on Mar. 21, 2008, provisional application No. 61/039,112, filed on Mar. 25, 2008.

(30) Foreign Application Priority Data

Aug. 18, 2008    (KR) .................. 10-2008-0080323

(51) Int. Cl.
*H04L 12/26* (2006.01)
*H04W 76/04* (2009.01)
(52) U.S. Cl. ........................ 370/252; 370/329
(58) Field of Classification Search ............ 370/252, 370/235, 329
See application file for complete search history.

(56) References Cited

U.S. PATENT DOCUMENTS

| | | |
|---|---|---|
| 2003/0016702 A1 | 1/2003 | Bender et al. |
| 2003/0086384 A1 | 5/2003 | Kwon et al. |
| 2005/0163076 A1 | 7/2005 | Vannithamby et al. |
| 2008/0225786 A1* | 9/2008 | Han et al. .............. 370/329 |
| 2009/0197542 A1* | 8/2009 | Buckley et al. ......... 455/70 |

* cited by examiner

*Primary Examiner* — Brian D Nguyen
(74) *Attorney, Agent, or Firm* — Birch, Stewart, Kolasch & Birch, LLP

(57) ABSTRACT

A method for monitoring a control channel in a wireless communication system is provided. The method includes: dividing a control region of a subframe into a common search space having a variable size and monitored by every user equipment (UE) within a cell and a dedicated search space having a variable size and including at least one UE-specific search space to be monitored by at least one UE within the cell, and monitoring a control channel within the common search space; and monitoring a control channel within the UE-specific search space included in the dedicated search space. The performance of an overall system can be improved by effectively monitoring a downlink control channel.

8 Claims, 16 Drawing Sheets

Figure 12

METHOD FOR MONITORING CONTROL CHANNEL IN WIRELESS COMMUNICATION SYSTEM

CROSS REFERENCE TO RELATED APPLICATIONS

This application is a National Phase of PCT/KR2009/001404 filed on Mar. 19, 2009, which claims priority under 35 USC 119(e) to U.S. Provisional Application Nos. 61/038,056, 61/038,415 and 61/039,112 filed Mar. 20, 2008, Mar. 21, 2008 and Mar. 25, 2008 respectively and under 35 USC 119(a) to Patent Application No. 10-2008-0080323 filed in Republic of Korea, on Aug. 18, 2008, all of which are hereby expressly incorporated by reference into the present application.

TECHNICAL FIELD

The present invention relates to wireless communication and, more particularly, to a method for monitoring a control channel to effectively detect control information.

BACKGROUND ART

In a wireless communication system, generally, a base station (BS) provides a service to a plurality of user equipments. The BS schedules user data with respect to the plurality of user equipments and transmits control information including scheduling information about user data along with user data. In general, a channel carrying the control information is called a control channel, and a channel carrying the user data is called a data channel. A user equipment (UE) monitors the control channel to find its control information and processes its data by using the control information. Here, monitoring refers to attempting to decode control channel candidates.

In order for the UE to receive user data allocated to the UE itself, it must necessarily receive control information about user data on the control channel. In this respect, however, generally, control information of a plurality of terminals are multiplexed in a single transmission interval in a given bandwidth. Namely, in order to provide a service to a plurality of UEs, the BS multiplexes the control information regarding the plurality of UEs and transmits them via a plurality of control channels. Then, each UE finds its own control channel among the plurality of control channels.

One of schemes for detecting particular control information from among the multiplexed control information is blind decoding. Blind decoding attempts to recover a control channel by using information of several combinations in a state that the UE does not have information required for recovering the control channel. Namely, the UE decodes all the control information provided to the UE until such time as it finds its control information in a state that the UE is not aware that the plurality of control information provided from the BS are its control information or where its control information is positioned. In order for the UE to discriminate whether or not certain information is its control information, the UE may use specific information of the UE. For example, when the BS multiplexes the control information of each UE, it may mask a specific identifier of each UE in a cyclic redundancy check (CRC) and transmit the same. The CRC is a code used for detecting an error. Upon receiving the control information, the UE damasks its specific identifier and checks the CRC to determine whether or not the received control information is its control information.

If the UE fails to properly detect its control information from among the multiplexed control information, it cannot decode user data on the data channel. Thus, it can be said that fast, accurate detection of the control information may significantly affect the performance of the overall system. However, it may have a difficulty in detecting the control information through the simple blind decoding.

Each UE may need different control information and use a channel encoding method using a different code rate, so the size of the control information of each UE may be different. Thus, the number of attempting to perform blind decoding within a control region in which the control information is transmitted may unexpectedly increase. As the detection attempt number of times increases, power consumption of a battery of the UE increases.

Thus, a method for effectively monitoring a control channel capable of reducing power consumption of the battery of the UE by reducing the detection attempt number to quickly detect control information is required.

SUMMARY OF INVENTION

Technical Problem

An object of the present invention is to provide a method for effectively monitoring a control channel.

Technical Solution

In one aspect, there is provided a method for monitoring a control channel in a wireless communication system. The method may include: dividing a control region of a subframe into a common search space having a variable size and monitored by every user equipment (UE) within a cell and a dedicated search space having a variable size and including at least one UE-specific search space to be monitored by at least one UE within the cell, and monitoring a control channel within the common search space; and monitoring a control channel within the UE-specific search space included in the dedicated search space.

In another aspect, there is provided a method for transmitting downlink control information in a wireless communication system. The method may include: dividing a control region of a subframe into a common search space and a dedicated search space to set the common search and the dedicated search space or setting the control region of the subframe entirely as a common search space or a dedicated search space, according to the blocking probability that UE-specific search spaces of a plurality of UEs will overlap with each other within a dedicated search space; and transmitting downlink control information on a downlink control channel in the control region.

In another aspect, there is provided a method for monitoring a control channel in a wireless communication system. The method may include: determining whether to use a search space for monitoring a control channel within a control region of a subframe; and when the search space is determined to be used, monitoring the control channel within the search space.

Advantageous Effects

A UE can effectively monitor a downlink control channel. Thus, the performance of an overall system can be improved.

DESCRIPTION OF DRAWINGS

FIG. 12 illustrates monitoring of a control channel.

MODE FOR INVENTION

Figure 1:
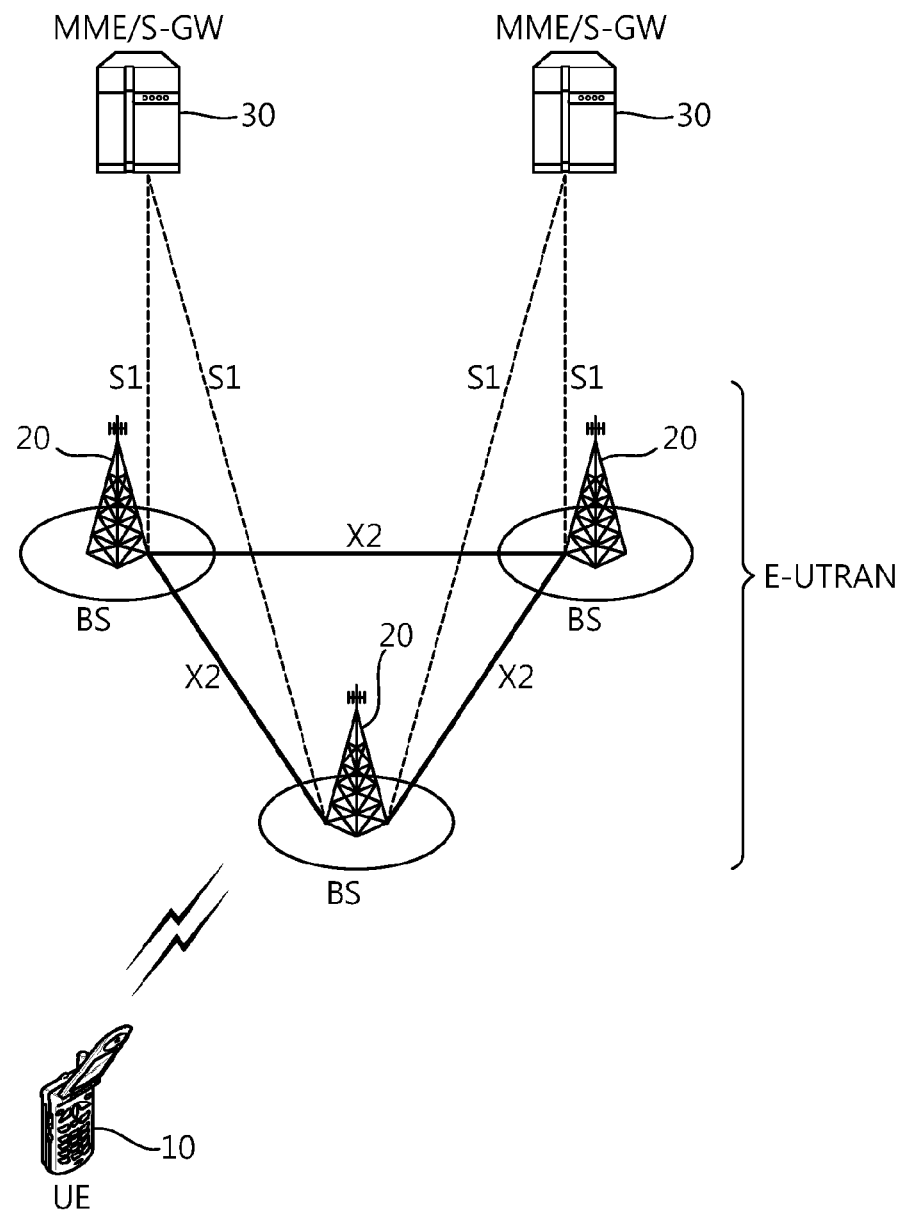
FIG. 1 illustrates a wireless communication system.

FIG. 1 shows a wireless communication system. The wireless communication system may have a network architecture of an E-UMTS (Evolved—Universal Mobile Telecommunications System). The E-UMTS system may be a LTE (Long Term Evolution) system. The wireless communication system is widely deployed to provide a variety of communication services such as communication of voice, packet data, etc.

Referring to FIG. 1, the E-UTRAN (Evolved-UMTS Terrestrial Radio Access Network) includes a base station (BS) 20 which provides a control plane and a user plane.

The UEs 10 may be fixed or mobile, and may be referred to by other terminologies such as mobile station (MS), user terminal (UT), subscriber station (SS), wireless device, etc. The BS 20 generally refers to a fixed station that communicates with the UEs 10 and may be called by other terminologies such as eNB (evolved-NodeB), base transceiver system (BTS), access point (AP), etc. One BS 20 may provide a service to at least one cell. Cells are areas to which the BS 20 provides a communication service. An interface for transmitting user traffic or control traffic may be used between the BSs 20. Hereinafter, downlink refers to communication from the BS 20 to the UEs 10, and uplink refers to communication from the UEs 10 to the BS 20.

The BSs may be connected through an X2 interface. The BS 20 is connected to an evolved packet core (EPC), specifically, to a mobility management entity (MME)/serving gateway (S-GW) 30, through an S1 interface. The S1 interface supports a many-to-many relationship between the BS 20 and the MME-/S-GW 30.

Figure 2:
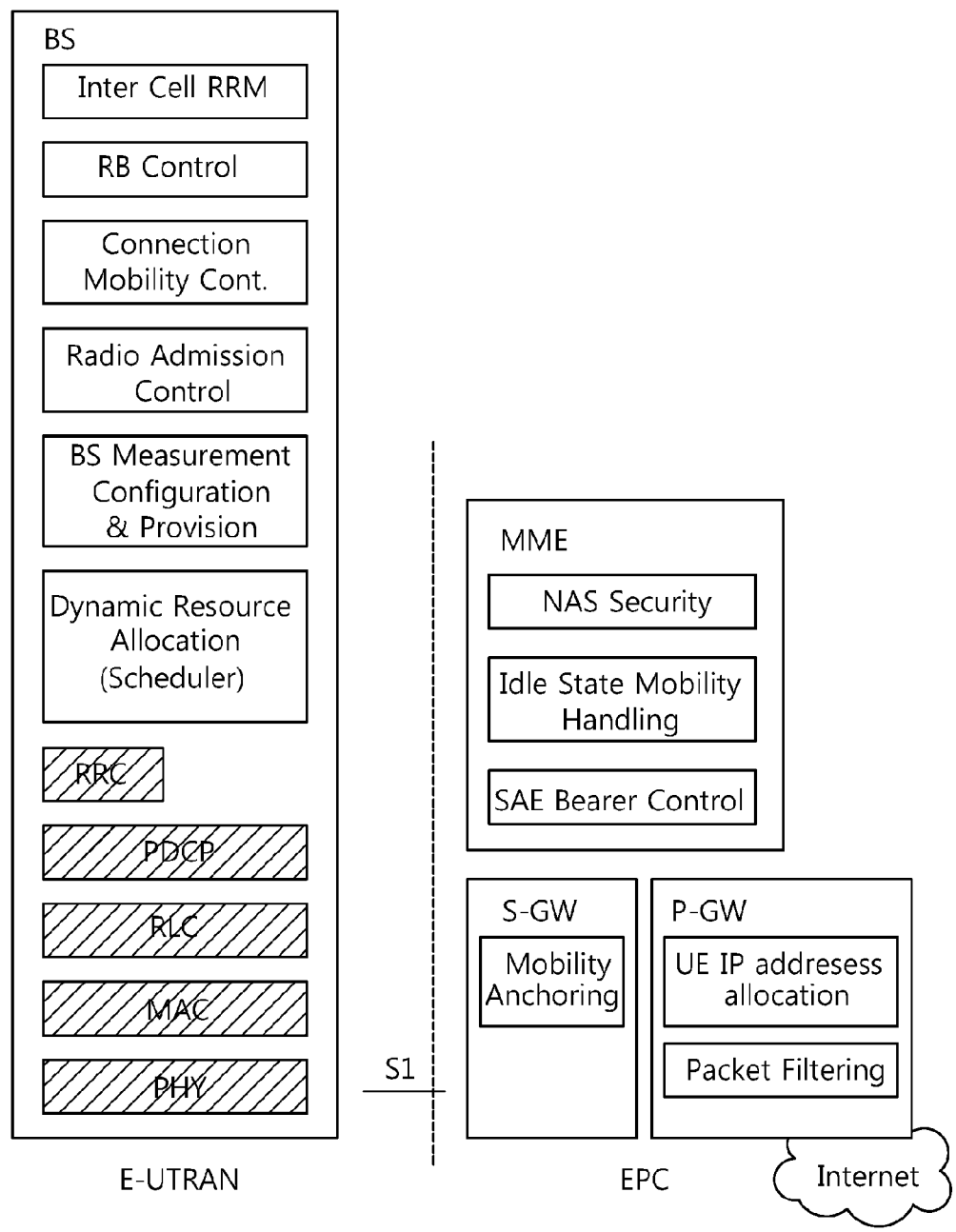
FIG. 2 is a block diagram showing function split between E-UTRAN and EPC.

FIG. 2 is a block diagram showing function split between E-UTRAN and EPC. Shaded boxes represent radio protocol layers, and non-shaded boxes represent functional entities of a control plane.

With reference to FIG. 2, the BS performs the following functions: (1) Radio resource management (RRM) functions such as radio bearer control, radio admission control, connection mobility control, and dynamic radio resource; (2) Internet protocol (IP) header compression and user data stream encryption; (3) Routing of user plane data to S-GW; (4) Scheduling and transmission of a paging message; (5) Scheduling and transmission of broadcast information; and (6) Measurement for mobility and scheduling and configuration of measurement report.

The MME performs the following functions: (1) Non-access stratum (NAS) signaling; (2) NAS signaling security; (3) Idle mode UE reachability; (4) Tracking area list management; (5) Roaming; and (6) Authentication.

The S-GW performs the following functions: (1) Mobility anchoring; and (2) Lawful Interception. The P-GW (PDN-Gateway) performs the following functions: (1) UE IP allocation; and (2) Packet filtering.

Figure 3:
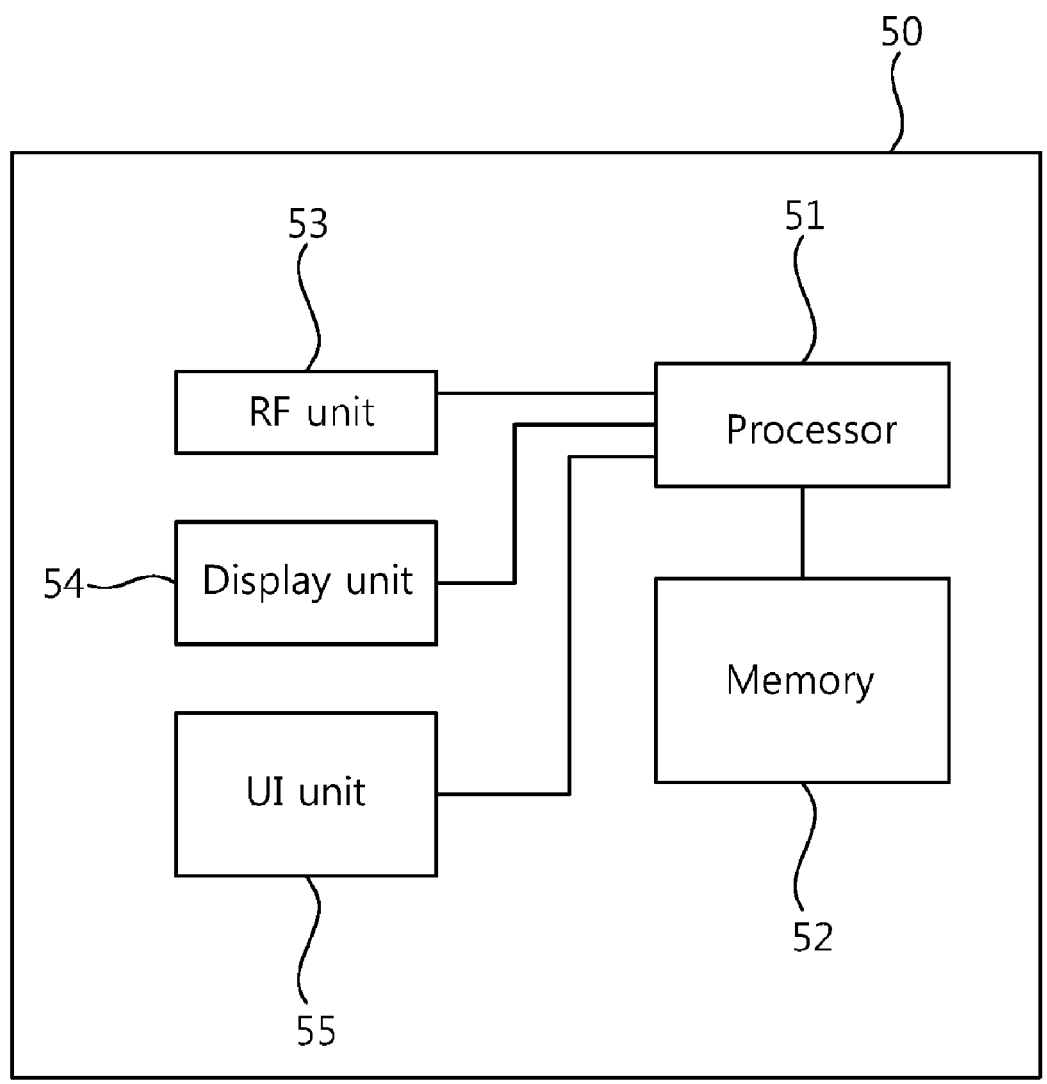
FIG. 3 is a schematic block diagram of a user equipment (UE).

FIG. 3 is a schematic block diagram of a user equipment (UE). A UE 50 includes a processor 51, a memory 52, an RF unit 53, a display unit 54, and a user interface (UI) unit 55. The processor 51 includes radio interface protocol layers implemented therein, providing a control plane and a user plane. Functions of the respective layers are implemented through the processor 51. The memory 52 is connected to the processor 51 to store a UE driving system, an application, and a general file. The display unit 54 displays various information of the UE 50, and as the display unit 54, a well-known element such as a liquid crystal display (LCD), an organic light emitting diode (OLED) display, or the like, may be used. The UI unit 55 may be configured as a combination of well-known UIs such as a keypad, a touch screen, and the like. The RF unit 53 is connected to the processor 51 to transmit and/or receive a radio signal.

The radio interface protocol layers between the UE and a network may be divided into a first layer (L1), a second layer (L2), and a third layer (L3) based on three lower layers of an open system interconnection (OSI) standard model widely known in communication systems. The first layer is a physical layer (PHY layer), a second layer may be divided into a medium access control (MAC) layer, a radio link control (RLC) layer, and a packet data convergence protocol (PDCP) layer. The third layer is a radio resource control (RRC) layer.

Figure 4:
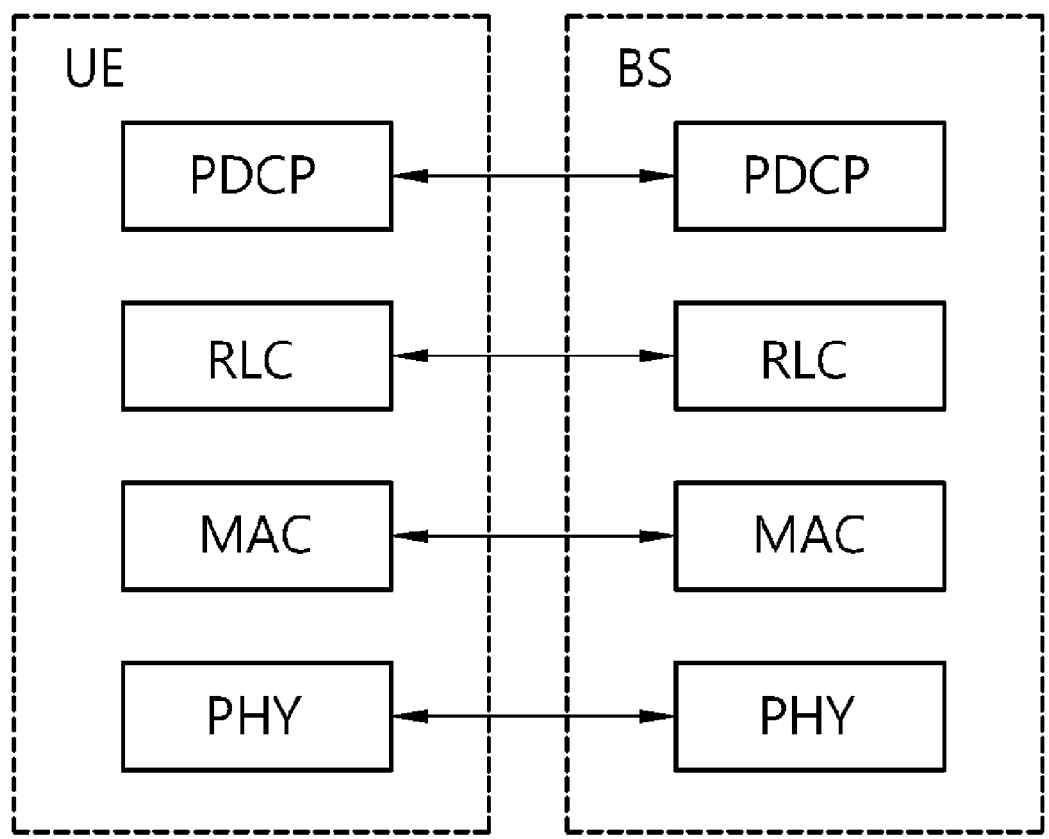
FIG. 4 is a block diagram showing a radio protocol architecture of a user plane.
Figure 5:
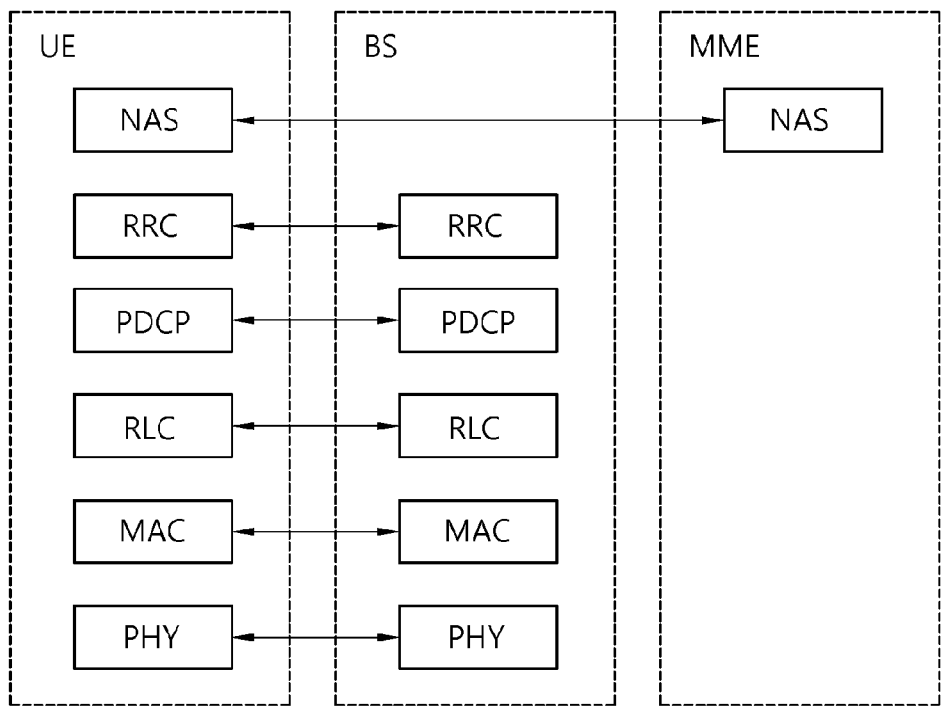
FIG. 5 is a block diagram showing a radio protocol architecture of a control plane.

FIG. 4 is a block diagram showing a radio protocol architecture of a user plane. FIG. 5 is a block diagram showing a radio protocol architecture of a control plane. These show the architectures of the radio interface protocols between the UE and an E-UTRAN. The user plane is a protocol stack for transmission of user data, and a control plane is a protocol stack for transmission of a control signal.

With reference to FIGS. 4 and 5, between different physical layers, namely, between a physical layer of a transmitting side and that of a receiving side, data is transferred via a physical channel. The physical layer is connected to the MAC layer via a transport channel. Data is moved between the MAC layer and the physical layer via the transport channel. The physical layer provides an information transfer service to the MAC layer and higher layers by using the transport channel.

The MAC layer provides a service to an RLC (Radio Link Control) layer, an higher layer, via a logical channel. The RLC layer supports reliable data transmission. The RLC layer includes three types of operation modes: a transparent mode (TM), an unacknowledged mode (UM), and an acknowledged mode (AM) according to a data transmission method. An AM RLC provides bi-directional data transmission service and supports re-transmission when transmission of an RLC PDU (Protocol Data Unit) fails. The PDCP layer performs a head compression function for reducing the size of an IP packet header.

The RRC layer is defined only at the control plane. The RRC layer serves to control radio resources between the UE and a network. To this end, the RRC layers exchange an RRC message between the UE and the network. The RRC layer controls a logical channel, a transport channel and a physical channel in relation to configuration, re-configuration, and releasing of radio bearers (RBs). RB refers to a service provided by the second layer for data transmission between the UE and the E-UTRAN. When there is an RRC connection between the RRC of the UE and that of the network, the UE is in an RRC-connected mode, or otherwise, the UE is in an RRC idle mode.

A NAS (Non-Access Stratum) layer positioned at an upper portion of the RRC layer performs a function such as session management, mobility management, or the like.

Figure 6:
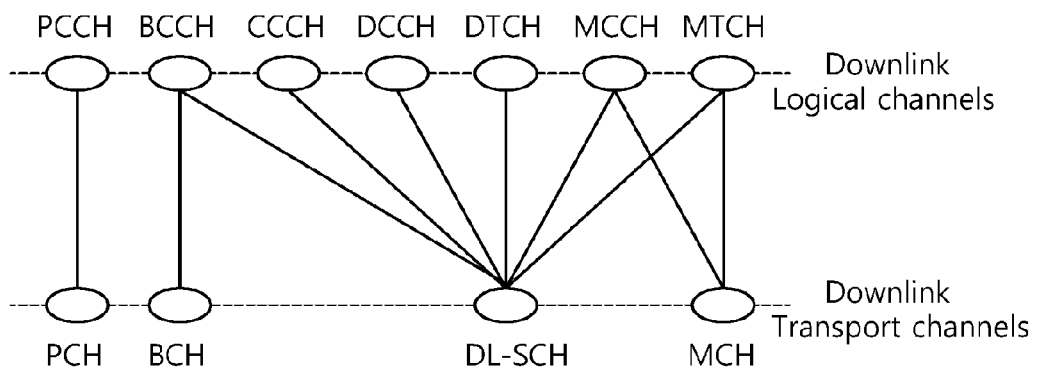
FIG. 6 illustrates mapping between downlink logical channels and downlink transport channels.

FIG. 6 illustrates mapping between downlink logical channels and downlink transport channels. This may be referred to section 6.1.3.2 of 3GPP TS 36.300 V8.3.0 (2007-12) Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

With reference to FIG. 6, a PCCH (Paging Control Channel) is mapped to a PCH (Paging Channel), a BCCH (Broadcast Control Channel) is mapped to a BCH (Broadcast Channel) or a DL-SCH (Downlink Shared Channel). A CCCH (Common Control Channel), a DCCH (Dedicated Control Channel), a DTCH (Dedicated Traffic Channel), a MCCH (Multicast Control Channel) and an MTCH (Multicast Traffic Channel) are mapped to a DL-SCH. The MCCH and MTCH are mapped also to an MCH (Multicast Channel).

Types of the logical channels are defined depending on what type of information they transmit. The logical channels include two different types of a control channel and a traffic channel.

The control channel is used to transmit control plane information. The BCCH is a downlink channel for broadcasting system control information. The PCCH is a downlink channel for transmitting paging information, which is used when the network does not know about the location of the UE. The CCCH is a channel for transmitting control information between the UE and the network, which is used by the UE when there is no RRC connection with the network. The MCCH is a point-to-multipoint downlink channel used to transmit an MBMS (multimedia broadcast multicast service), and is used for UEs that receive an MBMS. The DCCH is a point-to-point bi-directional channel transmitting dedicated control information between the UE and the network, which is used by a UE having an RRC connection.

The traffic channel is used to transmit user plane information. The DTCH is a point-to-point channel for transmitting user information, which exists in both uplink and downlink. The MTCH is a point-to-multipoint downlink channel for transmitting traffic data, which is used for the UEs that receive an MBMS.

Transport channels are classified according to how data is transmitted through a radio interface and what kind of characteristics the transmission has. The BCH is broadcast in the entire cell area and has a fixed, previously defined transmission format. The DL-SCH is characterized by supporting a HARQ (hybrid automatic repeat request), supporting a dynamic link adaptation according to a change in modulation, coding, and transmission power, supporting the possibility of broadcast, the possibility of beamforming, and a dynamic/semi-static resource allocation, supporting discontinuous reception (DRX) for saving UE power, and supporting an MBMS transmission. The PCH is characterized by supporting DRX for saving UE power and supporting broadcasting to the entire cell area. The MCH is characterized by supporting broadcasting to the entire cell area and MBSFN (MBMS Single Frequency Network).

Figure 7:
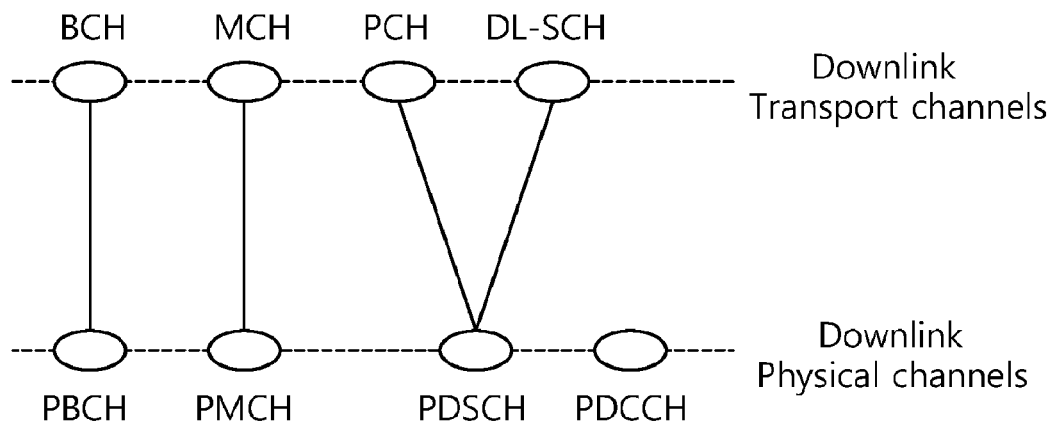
FIG. 7 illustrates mapping between the downlink transport channels and downlink physical channels.

FIG. 7 illustrates mapping between the downlink transport channels and downlink physical channels. This may be referred to section 5.3.1 of 3GPP TS 36.300 V8.3.0 (2007-12).

With reference to FIG. 7, a BCH is mapped to a PBCH (physical broadcast channel), an MCH is mapped to a PMCH (physical multicast channel), a PCH and a DL-SCH are mapped to a PDSCH (physical downlink shared channel). The PBCH carries a BCH transmission block, the PMCH carries the MCH, and the PDSCH carries DL-SCH and PCH.

Some downlink physical control channels are used in the physical layer. A PDCCH informs the UE about a resource allocation of the PCH and the DL-SCH and provides HARQ information regarding the DL-SCH. The PDCCH may carry an uplink scheduling grant informing the UE about a resource allocation of an uplink transmission. A PCFICH (physical control format indicator channel) informs the UE about the number of OFDM (Orthogonal Frequency Division Multiplexing) symbols used for a transmission of PDCCHs within a subframe. The PCFICH is transmitted for every subframe. A PHICH (physical Hybrid ARQ Indicator Channel) carries an HARQ ACK/NACK signal in response to an uplink transmission.

Figure 8:
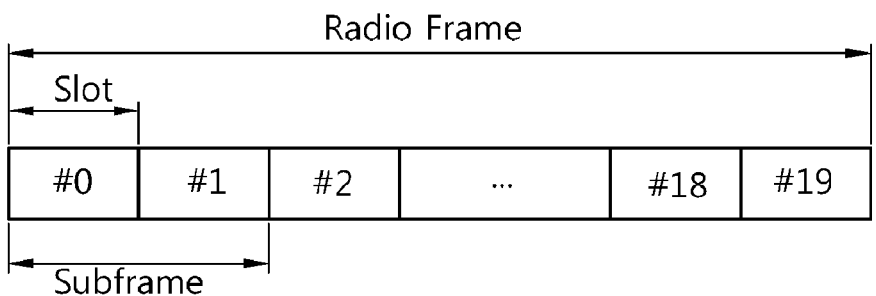
FIG. 8 shows the structure of a radio frame.

FIG. 8 shows the structure of a radio frame.

With reference to FIG. 8, a radio frame includes ten subframes, and a single subframe includes two slots. The slots within the radio frame are numbered 0 to 19. Also, subframes within the radio frame may be numbered 0. to 9. Time taken for transmitting a single subframe is called a transmission time interval (TTI). For example, the length of one radio frame may be 10 ms, the length of one subframe may be 1 ms, and the length of one slot may be 0.5 ms.

The structure of the radio frame is merely illustrative, and the number of subframes included in the radio frame or the number of slots included in the subframes may vary.

Figure 9:
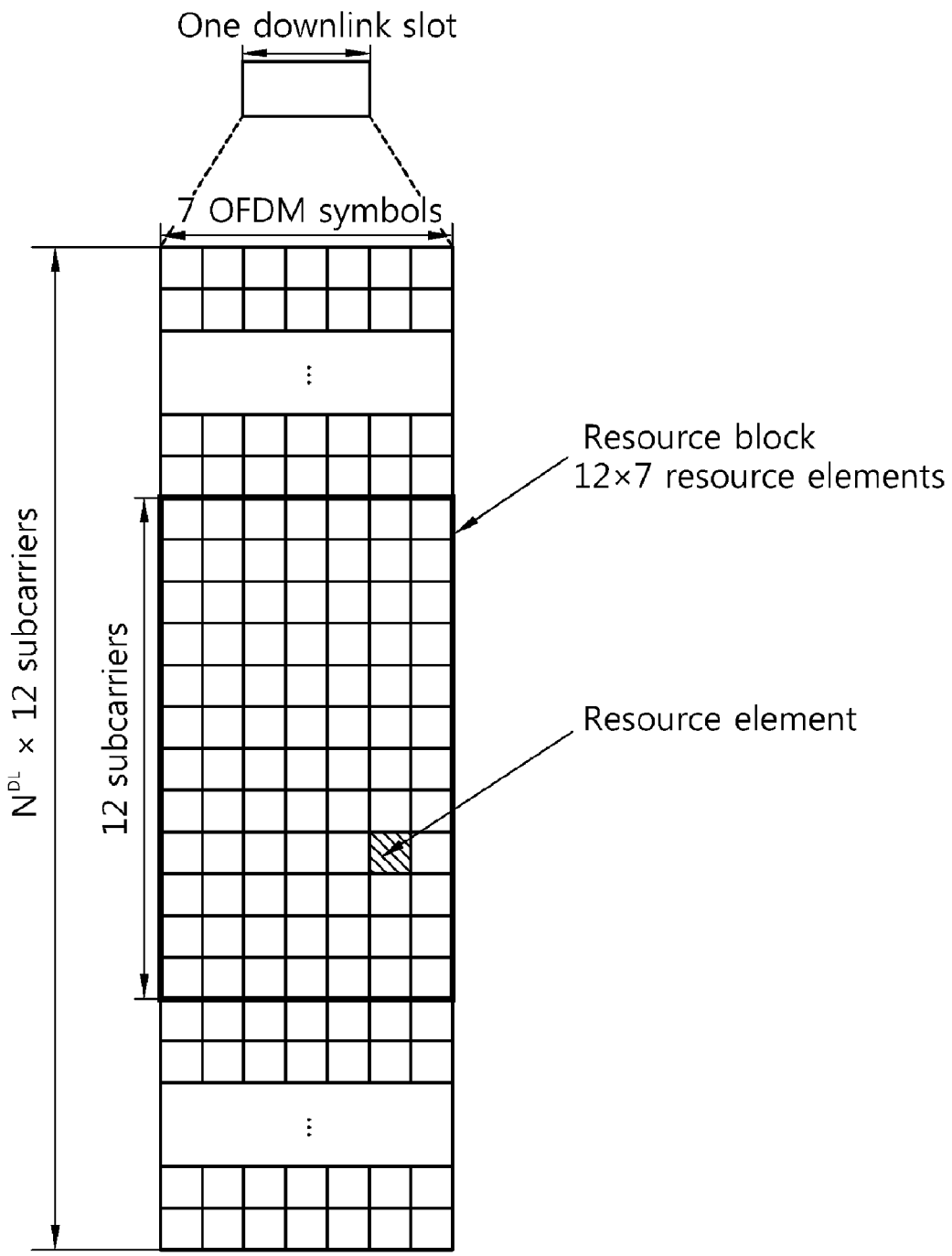
FIG. 9 illustrates a resource grid of one downlink slot.

FIG. 9 illustrates a resource grid of a single downlink slot.

With reference to FIG. 9, one downlink slot includes a plurality of OFDM symbols in a time domain and $N_{DL}$ number of resource blocks (RBs) in a frequency domain. The $N_{DL}$ number of resource blocks included in the downlink slot is dependent upon a downlink transmission bandwidth set in a cell. Each element on the resource grid is called a resource element. Here, it is illustrated that one resource block includes 12×7 resource elements made up of twelve subcarriers in the frequency domain and seven OFDM symbols in the time domain, but the number of subcarriers and the number of OFDM symbols in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6.

Figure 10:
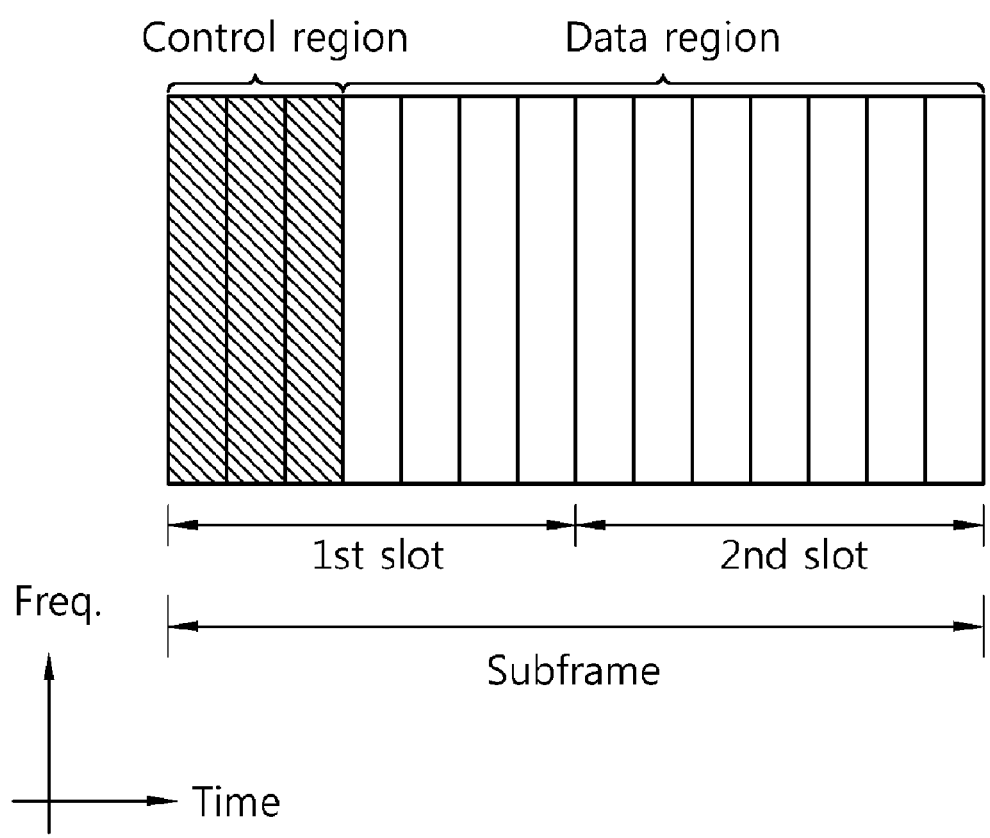
FIG. 10 shows the structure of a subframe.

FIG. 10 illustrates the structure of a subframe.

With reference to FIG. 10, a subframe includes two consecutive slots. First three OFDM symbols of a first slot in the subframe correspond to a control region to which a physical downlink control channel (PDCCH) is allocated, and the other remaining OFDM symbols correspond to a data region to which a physical downlink shared channel (PDSCH) is allocated. Besides the PDCCH, a physical control format indicator channel (PCFICH), a physical HARQ indicator channel (PHICH), and the like, may be allocated to the control region. The UE decodes control information transmitted via the PDCCH to read data information transmitted via the PDSCH. Here, inclusion of three OFDM symbols in the control region is merely illustrative. The number of OFDM symbols included in the control region of the subframe can be known through the PCFICH.

The control region includes a control channel element (CCE) set, a plurality of CCEs. Hereinafter, the CCE set is a set of the entire CCEs constituting the control region in one subframe. The CCE corresponds to a plurality of resource element groups. For example, the CCE may correspond to nine resource element groups. The resource element groups are used to define mapping of control channels to resource element. For example, one resource element group may include four resource elements.

A plurality of PDCCHs may be transmitted within the control region. The PDCCH carries control information such as a schedule allocation. The PDCCH is transmitted on an aggregation of one or some consecutive CCEs. The format of the PDCCH and the number of bits of the PDCCH are determined depending on the number of CCEs. Hereinafter, the number of CCEs used for a PDCCH transmission is called a CCE aggregation level. For example, the CCE aggregation levels may be elements of {1, 2, 4, 8}.

Table 1 below shows examples of the formats of PDCCH and the number of available bits of PDCCH according to the CCE aggregation level.

TABLE 1

| PDCCH format | CCE aggregation level | Number of resource element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Control information transmitted via the PDCCH is called downlink control information (DCI). The DCI includes uplink or downlink scheduling information, an uplink power control command, control information for paging, control information for indicating a RACH response, and the like. A DCI format includes format 0 for scheduling PUSCH (Physical Uplink Shared Channel), format 1 for scheduling one PDSCH (Physical Downlink Shared channel) codeword, format 1A for compact scheduling of one PDSCH codeword, format 1C for very compact scheduling of DL-SCH (Downlink Shared Channel), format 2 for PDSCH scheduling in a closed-loop spatial multiplexing mode, format 2A for PDSCH scheduling in an open-loop spatial multiplexing mode, and formats 3 and 3A for transmitting a TPC (Transmission Power Control) command.

Figure 11:
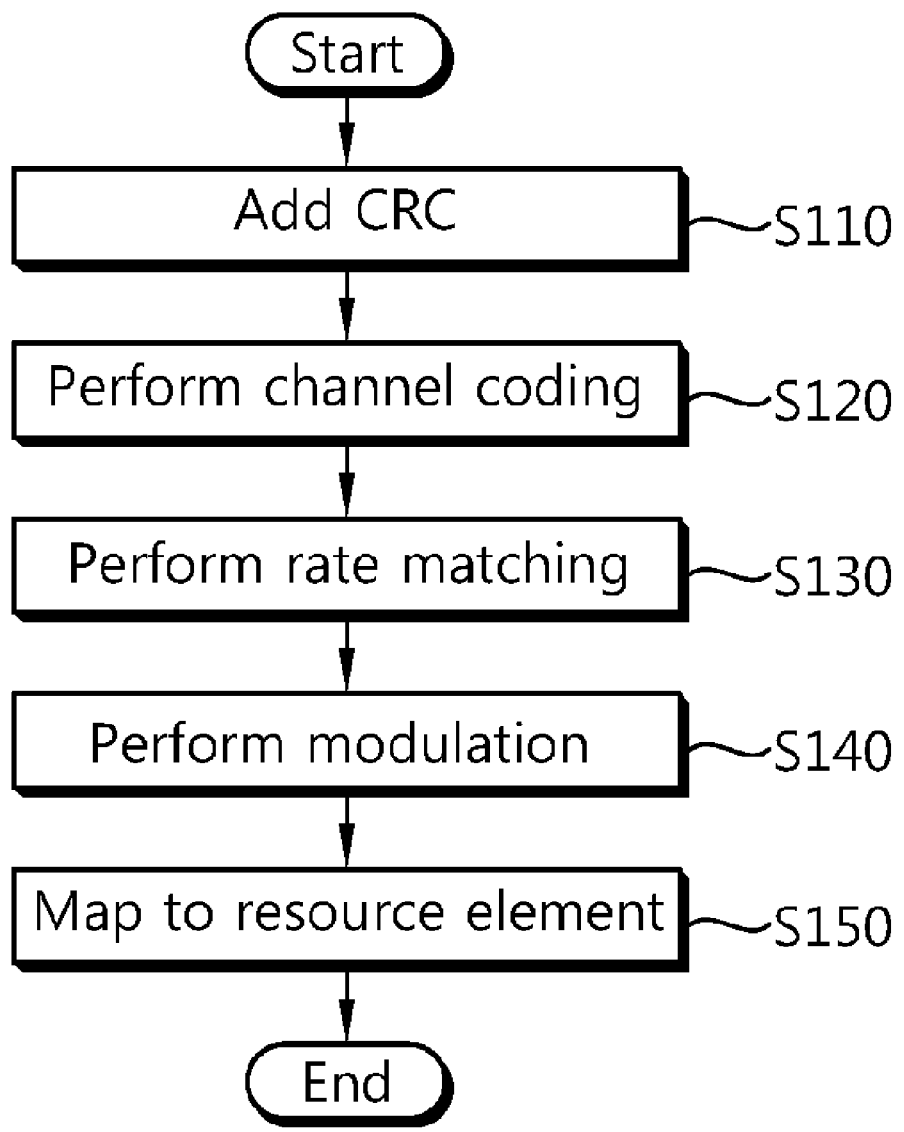
FIG. 11 is a flow chart illustrating the process of configuring a PDCCH.

FIG. 11 is a flow chart illustrating the process of configuring a PDCCH.

With reference to FIG. 11, in step S110, the BS adds a CRC (Cyclic Redundancy Check) for error detection to a DCI intended to be transmitted to the UE. In the CRC, an identifier (which is called an RNTI (Radio Network Temporary Identifier)) is masked according to an owner or the purpose of a PDCCH. When a PDCCH is for a particular UE, a specific identifier, e.g., a C-RNTI (Cell-RNTI), of the UE, may be masked on the CRC. Or, If a PDCCH is for a paging message transmitted via a PCH, a paging identifier, e.g., a P-RNTI (Paging-RNTI), may be masked on the CRC. If a PDCCH is for system information transmitted via a DL-SCH, a system information identifier, e.g., an SI-RNTI (System Information-RNTI), may be masked on the CRC. If a PDCCH is for indicating a random access response, a response to the transmission of a random access preamble of a UE, an RA-RNTI Random Access-RNTI) may be masked on the CRC. Table 2 below shows examples of identifiers masked on the PDCCH.

TABLE 2

| Type | Identifier | Description |
|---|---|---|
| UE-specific | C-RNTI | used for a unique UE identification |
| Common | P-RNTI | used for paging message |
|  | SI-RNTI | used for system information |
|  | RA-RNTI | used for random access response |

When the C-RNTI is in use, the PDCCH carries control information for a corresponding particular UE, and when a different RNTI is in use, the PDCCH carries common control information received by all the UEs within the cell.

In step S120, the BS performs channel coding on the CRC-added control information to generate coded data. In step S130, the BS performs rate matching according to the number of CCEs allocated to the PDCCH format. In step S140, the BS modulates the coded data to generate modulated symbols. In step S150, the BS maps the modulated symbols to resource elements.

A plurality of PDCCHs may be transmitted within one subframe. The UE monitors PDCCHs. Here, monitoring refers to attempting to decode each PDCCH according to the DCI format. The BS does not provide information regarding where corresponding PDCCHs exist in the control region allocated within the subframe to the UE. The UE monitors a set of PDCCH candidates within the subframe to find its PDCCH. This is called blind decoding. For example, when the UE damasks its C-RNTI from a PDCCH candidate and checks a CRC, if no CRC error is detected, the UE detects the PDCCH candidate as its PDCCH.

In an active mode, the UE monitors a set of PDCCH candidates of each subframe in order to receive data transmitted to the UE. In a DRX mode, the UE wakes up during a monitoring interval of every DRX period and monitors a set of PDCCH candidates in a subframe corresponding to the monitoring interval. The subframe in which the PDCCH monitoring is performed is called a non-DRX subframe.

In this manner, in order for the UE to receive the PDCCH transmitted to the UE itself, the UE must perform blind decoding on every CCE of the non-DRX subframe. In this case, because the UE does not know about a PDCCH format, the UE must decode PDCCHs according to the possible CCE aggregation level until such time as the blinding decoding of the PDCCH is successful.

Figure 12:
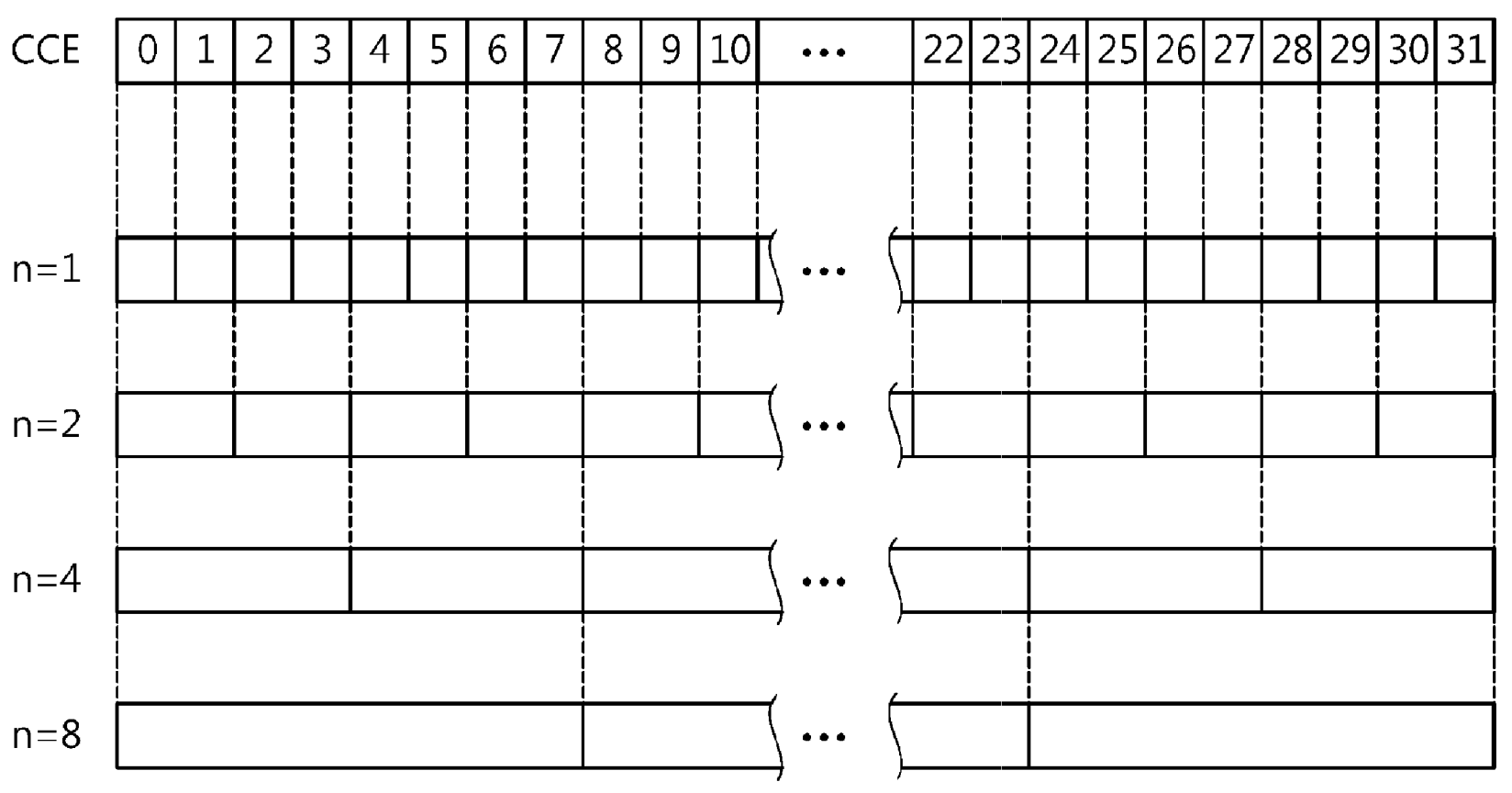

FIG. 12 illustrates monitoring of a control channel.

With reference to FIG. 12, the total number of CCEs within the corresponding subframe is 32. The CCEs are index-numbered from 0 to 31. There are four types of CCD aggregation levels of {1, 2, 4, 8}. It is assumed that a PDCCH having a CCE aggregation level 'n' starts from a CCD satisfying Equation 1 shown below:

$$i \bmod n = 0 \quad \text{[Equation 1]}$$

Here, 'i' is a CCE number, and 'mod' is a modulo operation.

The UE performs blind decoding by the CCE aggregation levels. Namely, first, the UE attempts to perform decoding according to the CCE aggregation level 1. When the decoding fails, the UE attempts to perform decoding according to the CCE aggregation level 2. Thereafter, the UE attempts to perform decoding according to the CCE aggregation level 4 and then according to the CCE aggregation level 8. Also, the UE attempts to perform blind decoding on all of the C-RNTI, P-RNTI, SI-RNTI, and RA-RNTI. In addition, the UE attempts to perform blind decoding on every DCI format to be monitored.

In this manner, when the UE attempts to perform blind decoding on the every DCI format to be monitored, on every possible RNTI, by all the CCE aggregation levels, the number of detection attempts excessively increases. This may increase the power consumption of a battery of the UE for PDCCH monitoring. Thus, a method for effectively monitoring a control channel capable of reducing power consumption of a battery of the UE by reducing the number of detection attempts for blind decoding is required.

In order to reduce the number of detection attempts according to blind decoding, the PDCCH carrying particular control information is not allocated arbitrarily on the CCE set but allocated to by limiting a particular position, a particular starting location or a particular range of the CCE set. In this case, the UE can perform blind decoding at the particular position, starting from the particular starting location, or only within the particular range, in order to search for the PDCCH. Thus, the number of detection attempts according to the blind decoding can be reduced. Hereinafter, the particular range of the CCE set will be described as a search space.

The search space is a space for searching for the PDCCH from the logical CCE column. The set of PDCCH candidates to be monitored is defined according to the search space. The search space is a set of contiguous CCEs starting from the particular starting location within the CCE set according to the CCE aggregation level. The CCE aggregation level is the number of CCEs used for PDCCH transmission and a CCE unit for searching for the PDCCH. The size of the CCE aggregation level is defined by the number of contiguous CCEs. The search space is defined for each of the CCE aggregation levels. The positions of the PDCCH candidates are independently generated within the search space according to the CCE aggregation levels. Namely, the particular starting location at which the PDCCH may be positioned may differ depending on the respective CCE aggregation levels.

The control information carried on the PDCCH may be classified into common control information received by every UE within the cell and UE-specific control information received by a particular UE within the cell. The BS multiplexes the common control information and the UE-specific control information regarding a plurality of UEs and transmits the same. Thus, the CCE set may be divided into a common search space with respect to the common control information and a dedicated search space with respect to the multiplexed UE-specific control information.

Figure 13:
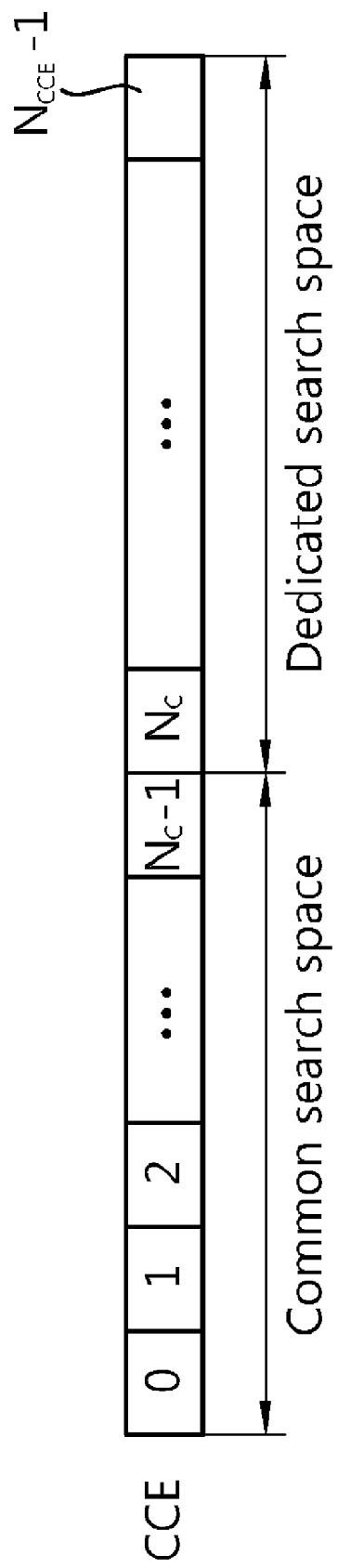
FIG. 13 illustrates an example of a common search space and a dedicated search space.

FIG. 13 illustrates an example of a common search space and a dedicated search space.

With reference to FIG. 13, the CCE set is divided into the common search space and the dedicated search space. The total of the CCEs, the size of the CCE set, is $N_{CCE}$. CCEs are index-numbered from 0 to $N_{CCE}-1$. Here, it is assumed that a starting location of the common search space is the first of the CCEs on the logical CCE set, the total number of CCEs is $N_{CCE}$, and the starting location of the dedicated search space is $N_C$. Namely, the $N_C$ number of CCEs are allocated to the common search space and the other remaining CCEs are allocated to the dedicated search space. In this manner, the common search space and the dedicated search space are divided such that they do not overlap. Namely, the CCEs constituting the common search space and the CCEs constituting the dedicated search space do not overlap.

A PDCCH carrying common control information is allocated to the common search space. The UE knows about the location and range of the common search space of the CCE set. The UE may perform blind decoding on the set of PDCCH candidates carrying the common control information within the common search space to thus reduce the number of detection attempts. The common control information includes control information for a paging message, control information for system information, control information for changing system information, control information for a random access response, and the like. In the common control information, an RNTI for each common control information can be masked to CRC. For example, P-RNTI, SI-RNTI, RA-RNTI, and the like, may be masked according to each common control information. The common control information allocated to the common search space may be limited to particular common control information.

The common search space may vary for each subframe or may be the same for every subframe. The starting location of the common search space is the same for every UE within the cell. Namely, the starting location of the common search space is fixed for every UE within the cell. The starting location of the common search space may be the same for every cell. Or, different starting locations of common search spaces may be set for each cell to randomize an inter-cell interference. The starting location of the common search space may be previously set between the BS and the UE, or the BS may inform the UE about the starting location of the common search space through RRC signaling or system information.

UE-specific search spaces of the plurality of UEs are multiplexed in the dedicated search space. Namely, a plurality of UE-specific search spaces are allocated in the dedicated search space. A PDCCH carrying UE-specific control information is allocated to the UE-specific search spaces within the dedicated search space. The UE may attempt blind decoding on a set of PDCCH candidates carrying the UE-specific control information only within the UE-specific search spaces, thus reducing the number of detection attempts. To this end, the UE finds a starting location of its UE-specific search space within the dedicated search space and attempts blind decoding on the set of PDCCH candidates carrying UE-specific control information, starting from the starting location. In this case, the starting location of the UE-specific search space may be different for each UE, each subframe, and a CCE aggregation level.

The UE-specific control information includes downlink scheduling allocation information, uplink scheduling allocation information, and the like, regarding the particular UE. The UE-specific control information allocated to the UE-specific search space may be limited to UE-specific control information having a relatively long information payload. A change in the payload length of the downlink scheduling allocation or uplink scheduling allocation with respect to SIMO (Single Input Multiple Output)/MIMO (Multiple Input Multiple Output) is semi-static. Thus, blind decoding is performed according to the DCI format corresponding to a transmission mode used in the corresponding subframe in the UE-specific search space within the subframe. In the UE-specific control information, the C-RNTI may be masked on the CRC.

Namely, the common search space is a search space monitored by every UE within the cell, and the UE-specific search space is a search space monitored by a particular UE. The UE monitors both the common search space and the UE-specific search space.

Table 3 below shows examples of search spaces. The size (L) of the CCD aggregation levels and the number ($M^{(L)}$) of the PDCCH candidates are merely illustrative and not limited thereto.

TABLE 3

| Type | Search space Aggregation Level L [CCEs] | Size of Search Space [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

The UE-specific search space supports a CCE aggregation level L∈{1, 2, 4, 8}, and the common search space supports a CCE aggregation level L∈{4, 8}. The size of the search space is determined according to the size of the CCE aggregation level and the number of PDCCH candidates. Namely, the size of the search space is an integral multiple of the size of the CCE aggregation level or of the number of the PDCCH candidates.

When the total number of CCEs in kth subframe is $N_{CCE,k}$, a search space $S_k^{(L)}$ in the CCE aggregation level L∈{1, 2, 4, 8} can be represented by Equation 2 shown below:

$$(Z_k^{(L)}+i) \bmod N_{CCE,k} \quad [\text{Equation 2}]$$

Here, $Z_k^{(L)}$ is a starting location of the search space, and i=0, 1, . . . , $M^{(L)} \cdot L-1$, $M^{(L)}$ are the number of PDCCH candidates in the given search space. The starting location is a location in which the first CCE of the CCE aggregate, which can become the first PDCCH candidate, is positioned within the search space according to each CCE aggregation level. The UE decodes the PDCCH candidates, starting from the starting location within the search space, by the CCE aggregation levels, to determine whether or not the PDCCH has been allocated to the UE. The modulo operation refers to circulative searching on the CCE set.

The starting location of the UE-specific search space may differ for each UE, each subframe, and each CCE aggregation level. The starting location of the common search space is the same for every UE within the cell. For example, the starting location may be set to be $Z_k^{(L)}=0$ for two CCE aggregation levels of L=4 and L=8 in the kth subframe.

Figure 14:
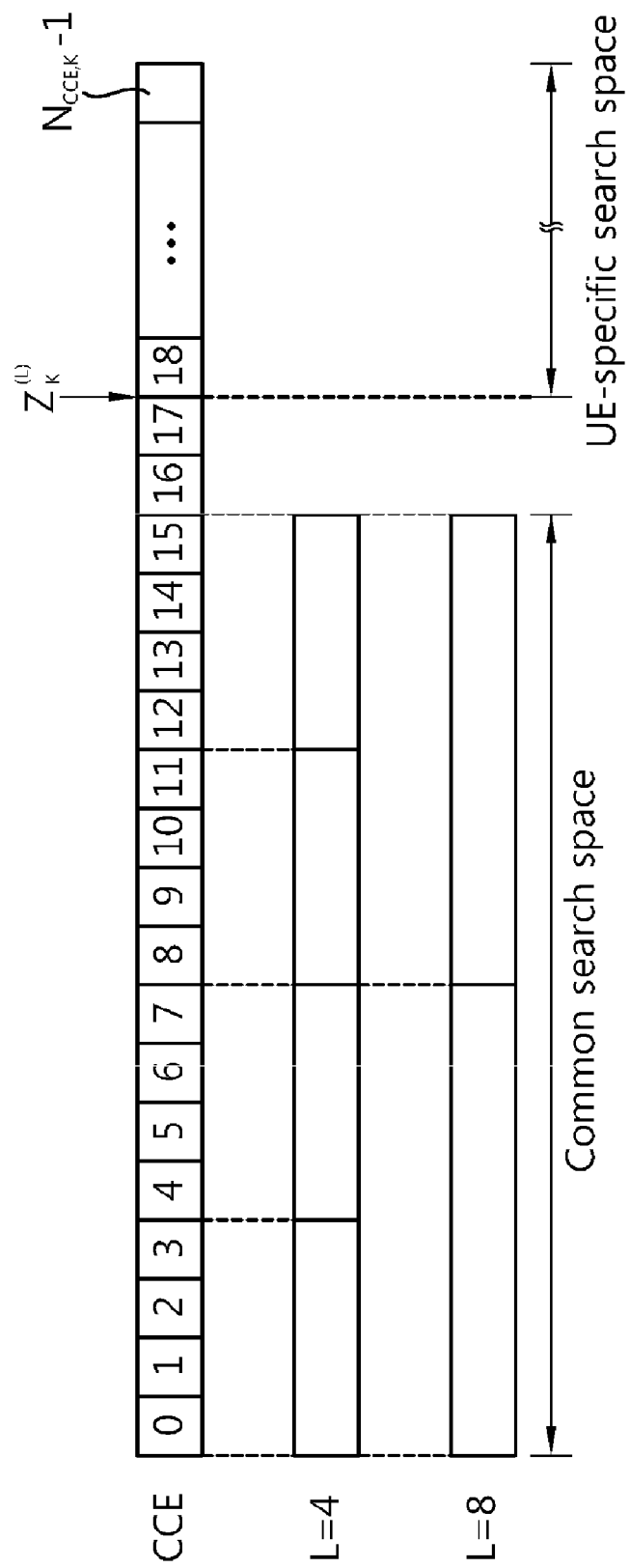
FIG. 14 illustrates monitoring of a control channel according to the common search space.
Figure 15:
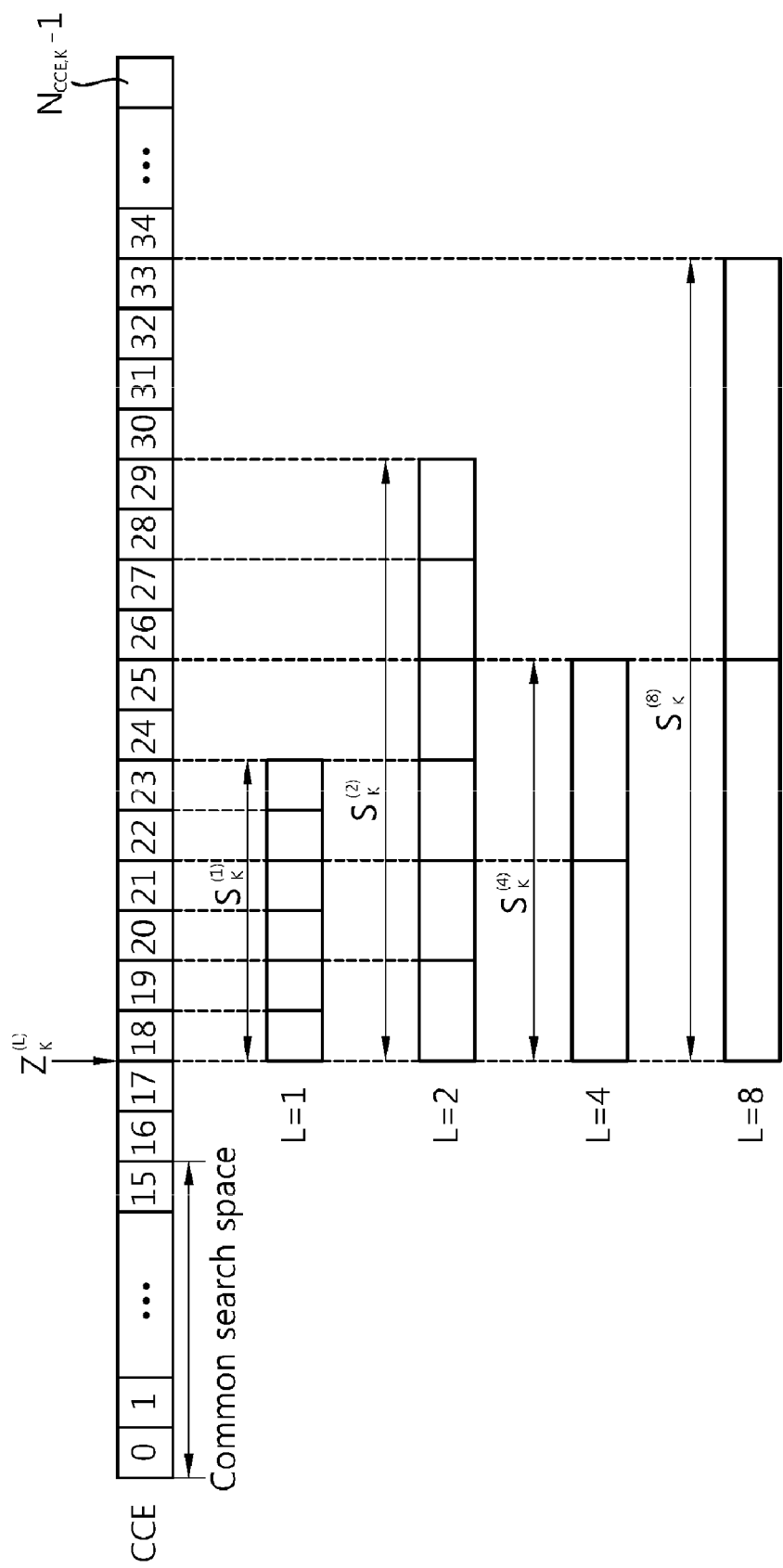
FIG. 15 illustrates monitoring of a control channel according to a UE-specific search space.

FIG. 14 illustrates monitoring of a control channel according to the common search space. FIG. 15 illustrates monitoring of a control channel according to the UE-specific search space.

With reference to FIGS. 14 and 15, the size of the CCE set, namely, the total number of CCEs, constituting a control region of the kth subframe is $N_{CCE,k}$. The CCEs are indexed, numbered from 0 to $N_{CCE,k}-1$. the total number of the CCEs is affected by the number of OFDM symbols used to transmit the PDCCHs within the subframe and the number of reference signals with respect to transmission antennas. The UE can know about the number of the OFDM symbols through a PCFICH. The UE can know about the number of transmission antennas through higher layer signaling.

Here, a starting location of the common search space of the logical CCE set having the total number of CCEs $N_{CCE,k}$ is the first CCE, namely, $Z_k^{(L)}=0$. It is assumed that the starting location of the common search space is the first CCE, and a starting location of the dedicated search space is 16. It is assumed that the starting location of the UE-specific search space with respect to a particular UE within the dedicated search space is $Z_k^{(L)}=18$ for all of the CCE aggregation levels 1, 2, 4, and 8. It is noted that the UE-specific search space varies for each of the CCE aggregation levels.

The UE monitors one common search space from each of the CCE aggregation levels 4 and 8, and monitors one UE-specific search space from each of the CCE aggregation levels 1, 2, 4, and 8. The UE attempts blind decoding on four PDCCH candidates in the common search space where the CCE aggregation level L=4. The UE attempts blind decoding on two PDCCH candidates in the common search space where the CCE aggregation level L=8. The UE attempts blind decoding on six PDCCH candidates in a UE-specific search space ($S_k^{(1)}$) where the CCE aggregation level L=1. The UE attempts blind decoding on six PDCCH candidates in a UE-specific search space ($S_k^{(2)}$) where the CCE aggregation level L=2. The UE attempts blind decoding on two PDCCH candidates in a UE-specific search space ($S_k^{(4)}$) where the CCE aggregation level L=4. The UE attempts blind decoding on two PDCCH candidates in a UE-specific search space ($S_k^{(8)}$) where the CCE aggregation level L=8.

In this case, however, when the CCE set is divided into the common search space and the dedicated search space, a blocking phenomenon may occur. The blocking phenomenon refers to a phenomenon that the UE-specific search spaces of a plurality of UEs overlap within the dedicated search space.

The case in which the blocking phenomenon may occur will now be described.

In order to find a starting location of the UE-specific search space within the dedicated search space, the UE may implement a hashing function. The hashing function refers to a function designating a starting location of a UE-specific search space within the dedicated search space. The hashing function may use a user equipment ID (Identifier), the CCE aggregation levels, a subframe number, the number of available CCEs of a corresponding subframe, a particular constant number, and the like, as inputs. Hereinafter, the number of available CCEs of the corresponding subframe refers to the number of the remaining CCEs, excluding the common search space, of the CCE set.

The hashing function may output a starting location of the UE-specific search space as a CCE index number of the CCE set. Hereinafter, the starting location of the UE-specific search space outputted by the hashing function will be referred to as an initial starting point.

The number of initial starting points that may be indicated by the hashing function refers to the number of the aggregated CCEs to which the BS can map PDCCHs. For example, a mapping method may be based on OVSF (Orthogonal Variable Spreading Factor)-tree.

The number of initial starting points of each of the CCE aggregation level (L) may be represented by Equation 3 shown below:

$$\left\lfloor \frac{\text{Number of available } CCEs \text{ in subframe}}{L} \right\rfloor \quad \text{[Equation 3]}$$

The number of initial starting points may be generated to be small when the number of available CCEs within the subframe is small or when the CCE aggregation level is large. For example, the number of available CCEs within the subframe is small when a system bandwidth is small or when the number of OFDM symbols used for the transmission of the PDCCHs within the subframe is small.

The UE begins blind decoding of the PDCCH carrying UE-specific control information, starting from a CCE of the initial starting point. In this case, in order to reduce system overhead, the interval to be searched by the UE or the number of attempts of blind decoding may be limited. For example, when the CCE aggregation level is as low as 1 or 2, aggregation of n (n is a natural number) number of CCEs from the initial starting point may be set as a search interval, or n number of blind decoding attempts may be allowed. When the CCE aggregation level is as high as 4 or 8, aggregation of m number (m<n, m is a natural number) of CCEs from the initial starting point may be set as a search interval, or m number of blind decoding attempts may be allowed.

In this respect, in a situation in which the CCE aggregation level (L) is so high that the number of initial starting points is small, when the blind decoding attempt number is limited, UE-specific search spaces of the plurality of UEs may overlap within the dedicated search space. Namely, a blocking phenomenon possibly occurs. Thus, a method for reducing or preventing the occurrence of the blocking phenomenon is required when the blocking phenomenon is highly likely to occur.

First, the case in which the probability that the blocking phenomenon will occur is high will now be described. The BS can arbitrarily determine whether or not the probability of the occurrence of blocking is high in the dedicated search space. Also, whether or not the probability of the occurrence of blocking is high may be limited to the case in which the number of occurrence of blocking is higher than a threshold value or the probability of the occurrence of blocking is higher than a threshold value. Also, whether or not the probability of the occurrence of blocking is high can be determined by comparing a particular parameter and a threshold value. The regulation of determining the probability of the occurrence of blocking may be previously set between the BS and the UE or the BS may inform the UE about that through signaling or system information.

When the probability of the occurrence of blocking is determined by comparing a particular parameter and a threshold value, the case in which the probability of the occurrence of blocking is high may be defined as follows. However, these are merely illustrative and not limited.

(1) When the number of initial starting points of a UE-specific search space in the dedicated search space within a subframe is p or smaller.

(2) When a system bandwidth is A[MHz (Megahertz)] or lower.

(3) When the number of OFDM symbols used for transmitting PDCCHs within the subframe is B or smaller. In this case, 'B' may vary according to systems. For example, in case of an LTE system, a maximum value of B is 3.

(4) When a transmission mode is MIMO and channel estimation is performed by using all the reference signals with respect to multiple transmission antennas within the subframe.

(5) When a CCE aggregation level is C or higher.

(1) to (5) may be independently applied regardless of other conditions.

(6) When a certain combination of (1) to (5), for example, when a system bandwidth is A[MHz] or lower and the number of OFDM symbols is B or lower, or when the number of OFDM symbols is B or lower and the CCE aggregation level is C or higher.

When the BS schedules control channels with respect to a plurality of UEs in downlink and transmits the same, if the probability of the occurrence of blocking is high in the dedicated search space, the BS may vary the number of CCEs constituting the common search space and the number of CCEs constituting the dedicated search space in order to reduce or prevent the blocking phenomenon. To this end, the BS may use the following method.

First, the BS does not use the common search space. Second, the BS includes a portion of the CCEs allocated to the common search space in the dedicated search space. Third, the BS uses both the first method of not using the common search space and the second method of including the portion of the CCEs allocated to the common search space in the dedicated search space.

The blocking phenomenon preventing method used by the BS in order to prevent the blocking phenomenon may be previously set between the BS and the UE or the BS may inform the UE through signaling or system information.

The UE determines whether or not the probability of the occurrence of blocking is high. The UE may periodically determine whether or not the probability of the occurrence of blocking is high. For example, when the number of initial starting points of the UE-specific search space in the dedicated search space within the subframe is p or lower, the UE determines that the probability of the occurrence of blocking is high. When the number of CCEs allocated to the common search space is fixed, the number of the initial starting points is information that can be known by every UE. Thus, the BS does not need to explicitly signal the number of initial starting points. When the UE determines that the probability of the occurrence of blocking is high, it performs blind decoding according to the blocking phenomenon preventing method.

Hereinafter, the respective blocking phenomenon preventing methods will now be described.

First, the method of not using a common search space will now be described.

When it is determined that the probability of the occurrence of blocking is high, the common search space is not used but all the CCEs of the CCE set within the subframe are used as a dedicated search space. The number of available CCEs of the CCE set within the subframe as an input of a hashing function is equivalent to the total number of CCEs of the CCE set. The hashing function can generate by using every CCE of the CCE set as an initial starting point, so the number of the initial starting points increases. Thus, no problem arises when each UE draws an initial starting point, so the probability of the occurrence of blocking can be lowered. Also, because the common search space is not used, decoding complexity can be reduced.

Second, the method of including a portion of the CCEs allocated to the common search space in the dedicated search space will now be described. Hereinafter, some CCEs included in the dedicated search space, among the CCEs allocated to the common search space, are referred to as overlap CCEs. The overlap CCEs are not used for the purpose of the common search space but used for the purpose of the dedicated search space.

It may be designed such that the number (N) of overlap CCEs is smaller than the number (M) of CCEs allocated to the common search space ($0 \leq N < M$). It may be designed such that the ratio (l) of the number of overlap CCEs to the number of CCEs allocated to the common search space is smaller than 1 ($0 \leq l < 1$). Or, it may be designed such that the ratio (k) of the number of overlap CCEs to the number of CCEs for the PDCCH carrying the common control information allocated to the common search space is smaller than 1 ($0 \leq k < 1$). In this case, it may be designed such that the number of overlap CCEs is the same or different for each of the CCE aggregation levels.

For example, it may be designed such that the ratio (l) of the number of the overlap CCEs to the number of CCEs allocated to the common search space is 0.5. It is assumed that the common search space includes aggregate of four CCEs where the CCE aggregation level is 4. In this case, the number of CCEs allocated to the common search space is 16. Eight CCEs, 50 percent of the sixteen CCEs, are included in the dedicated search space. Even when the common search space includes aggregate of two CCEs where the CCE aggregation level is 8, eight CCEs, 50 percent of the sixteen CCEs, are included in the dedicated search space.

The number of available CCEs within the subframe as an input of the hashing function includes the number of overlap CCEs. When the number of CCEs allocated to the common search space is fixed, the number of overlap CCEs is information that can be known by every UE. Thus, the UE can include the number of overlap CCEs in the number of available CCEs as the input of the hashing function, for which the BS does not need to perform signaling on the number of overlap CCEs. The hashing function may generate even the overlap CCEs as initial starting points. Thus, the number of initial starting points that can be indicated by the hashing function increases, so no problem arises when each UE draws the initial starting points. Namely, the probability that a blocking phenomenon will occur can be lowered.

The common search space and the UE-specific search space are concepts implemented for each UE within the cell or for each CCE aggregation level. Thus, not only the operation of hashing function but the operation of not using the common search space or the operation of including a portion of the CCEs allocated to the common search space in the dedicated search space can be naturally implemented without performing a complicated switching operation by the respective CCE aggregation levels.

Third, the method of using both the method of not using the common search space and the method of including a portion of the CCEs allocated to the common search space in the UE-specific search space will now be described. For example, when the probability (p) that a blocking phenomenon will occur is greater than x ($p > x$), the common search space is not used. Also, when the probability (p) that a blocking phenomenon will occur is between y and x ($y < p \leq x$), a portion of the CCEs allocated to the common search space is included in the dedicated search space.

Up to now, the method of not using the concept of the common search space or the method of including a portion of the CCEs allocated to the common search space in the dedicated search space have been described. When the probability of the occurrence of blocking is high, the entirety or a portion of the common search space may be included in the dedicated search space to lower the probability of the occurrence of blocking. Accordingly, the common search space and the UE-specific search space can be effectively used.

However, the PDCCH carrying common control information to be received by every UE within the cell is allocated to the common search space. A particular control channel such as control information for a paging message, control information for system information, and the like, among the common control information can be transmitted within a subframe which has been agreed with the BS. In this case, the UE only need to search the agreed subframe, rather than every subframe, for the corresponding PDCCH. Thus, the UE can easily receive corresponding control information. In a particular subframe where a particular control channel is transmitted, arbitrary inclusion of the entirety or a portion of the common search space in the dedicated search space without considering a reception probability of the particular control channel may be problematic. Thus, the method of including the entirety of a portion of the common search space may be limitedly used for a particular subframe. The particular subframe may be a subframe in which a particular control channel, which is transmitted periodically, is transmitted. Also, the particular subframe may be a subframe in which a particular control channel with respect to particular common control information is transmitted. Also, the particular subframe may be a subframe in which the entirety or a portion of a plurality of particular control channels are transmitted. Accordingly, the transmission of the particular control channel can be guaranteed and a reception probability of the particular control channel can be guaranteed by increasing the reception probability.

Hereinafter, the method of using the method of including the entirety or a portion of the common search space in the dedicated search space in a particular subframe limitedly will now be described.

First, for a particular subframe, the concept of the common search space is not used, or a portion of the CCEs allocated to the common search space is not included in the dedicated search space. In this method, the use of the entirety or a portion of the common search space in the dedicated search space is severely limited.

Second, for a particular subframe, the method of not using the common search space is not used, but a method of including a portion of the CCEs allocated to the common search space in the dedicated search space may be used. It may be designed such that the number of overlap CCEs is equal to or different from that of a general subframe. The method of designing the number of overlap CCEs same that of a general subframe is as follows. It may be designed such that the number (N) of overlap CCEs is smaller than the number (M) of CCEs allocated to the common search space ($0 \leq N < M$). It may be designed such that the ratio (l) of the number of overlap CCEs to the number of CCEs allocated to the common search space is smaller than 1 ($0 \leq l < 1$). Or, it may be designed such that the ratio (k) of the number of overlap CCEs to the number of CCEs for the PDCCH carrying the common control information allocated to the common search space is smaller than 1 ($0 \leq k < 1$). In this case, it may be designed such that the number of overlap CCEs is the same or different for each of the CCE aggregation levels.

It may be designed such that the number of overlap CCEs in a particular subframe is different from that of a general subframe. For example, in a particular subframe, the smaller number of overlap CCEs than that of the overlap CCEs in a general subframe may be permitted. Accordingly, the reception probability of a particular control channel can be guaranteed while lowering the blocking probability.

Up to now, the method of dividing the CCE set into the common search space and the dedicated search space and using the UE-specific search space by each UE in the dedicated search space has been described. The reason of dividing the entire CCEs constituting the control region within a subframe into the common search space and the dedicated search space aims at reducing the number of detection attempts according to blind decoding by limiting the search space to be monitored by each UE.

The UE can know about an initial starting point of the UE-specific search space within the dedicated search space through the hashing function. In this case, however, if the number of initial starting points is generated to be too small, the necessity of the UE-specific search space may be reduced. Thus, generation and use of the UE-specific search space by each UE needs to be limited according to the necessity of the UE-specific search space.

To this end, a switch on/off method may be used for the UE-specific search space. Namely, when it is determined that the UE-specific search space does not need to be used, the UE-specific search space is not used (switched off), and when it is determined that the UE-specific search space needs to be used, the UE-specific search space is used (switched on). Accordingly, the UE can maintain the performance of detecting the PDCCH transmitted to the UE itself, and the efficiency of the blind decoding can be improved.

For example, when the number of initial search points that can be indicated by the hashing function is smaller than a threshold value $P_i$, the UE-specific search space of a corresponding CCE aggregation level is switched off. When the number of initial search points exceeds the threshold value $P_i$, the UE-specific search space of the corresponding CCE aggregation level is switched on. Here, 'i' is an index of the CCE aggregation level. Namely, the UE-specific search space can be switched off or on for each of the CCE aggregation levels.

When the UE-specific search space is switched off, the BS may allocate the PDCCH carrying UE-specific control information to the entire CCE, the CCE set, in the subframe. The UE performs full blind decoding on the entire CCEs. The full blind decoding refers to performing blind decoding, starting from every available start point of the CCE set, rather than drawing an initial starting point by using the hashing function.

The threshold value $P_i$ of the number of initial starting points, the reference for switching on or off the UE-specific search space, may be set as the same value for each of the CCE aggregation levels or may be set to be a different value for each of the CCE aggregation levels. Or, the CCE aggregation levels may be classified into a plurality of groups, and the threshold value $P_i$ may be set to be same value for the CCE aggregation levels of the same group and may be set as different values by the groups.

The method of switching on or off the UE-specific search space may be applicable to a method for switching on or off the common search space.

For example, when the number of initial starting points in the common search space is same or smaller than a threshold value $Q_i$, the common search space of a corresponding CCE aggregation level is switched off. When the number of initial starting points in the common search space exceeds the threshold value $Q_i$, the common search space of the corresponding CCE aggregation level is switched on. Here, 'i' is the index of the CCE aggregation level. Namely, the common search space may be switched off or on by the CCE aggregation levels.

The number of the initial starting points in the common search space refers to the number of CCE aggregates to which the BS can map the PDCCH in the common search space.

Also, the number of initial starting points in the common search space refers to the number of CCE aggregates on which the UE may perform blind decoding in the common search space.

When the common search space is switched off, the BS may allocate the PDCCH carrying the common control information to the entire CCEs, the CCE set, within the subframe. The UE perform full blind decoding on the entire CCEs. Namely, the UE performs blind decoding, starting from every available start point of the CCE set.

The threshold value $Q_i$ of the number of initial starting points in the common search space, the reference for switching on or off the common search space, may be set as the same value for each of the CCE aggregation levels or may be set to be a different value for each of the CCE aggregation levels. Or, the CCE aggregation levels may be classified into a plurality of groups, and the threshold value $Q_i$ may be set to be same value for the CCE aggregation levels of the same group and may be set as different values by the groups.

The method of switching on or off the UE-specific search space and the method for switching on or off the common search space may be configured to simultaneously switch on or off two search spaces. To this end, the threshold value $P_i$ and the threshold value $Q_i$, the references for switching on and off two spaces, may be set as the same value.

In this manner, the search spaces, such as the UE-specific search space or the common search space, may be switched on or off according to the necessity of a search space. Thus, a method for determining the necessity of a search space is required. First, switching off a search space when the number of initial starting points is same or smaller than the threshold value as described above can be used as one example.

Whether or not a search space is required may be arbitrarily determined by the BS. Also, whether or not a search space is required may be determined by comparing a particular parameter and a threshold value. The regulation of determining the necessity of the search space may be previously set between the BS and the UE or the BS may inform the UE about that through signaling or system information.

When the necessity of a search space is determined by comparing a particular parameter and a threshold value, the case in which a search space is switched off because no search space is required may be defined as follows. However, these are merely illustrative and not limited.

(1) When the number of initial starting points of a UE-specific search space in the dedicated search space within a subframe is p or smaller.

(2) When a system bandwidth is A[MHz (Megahertz)] or lower.

(3) When the number of OFDM symbols used for transmitting PDCCHs within the subframe is B or smaller. In this case, 'B' may vary according to systems. For example, in case of an LTE system, a maximum value of B is 3.

(4) When a transmission mode is MIMO and channel estimation is performed by using all the reference signals with respect to multiple transmission antennas within the subframe.

(5) When a CCE aggregation level is C or higher.

(1) to (5) may be independently applied regardless of other conditions.

(6) When a certain combination of (1) to (5), for example, when a system bandwidth is A[MHz] or lower and the number of OFDM symbols is B or lower, or when the number of OFDM symbols is B or lower and the CCE aggregation level is C or higher.

Hereinafter, a substantial embodiment of the method of switching on or off UE-specific search space will now be described. This can be applicable to a method for switching on or off the common search space.

Table 4 below shows examples of the number of CCEs of a region on which blind decoding is to be performed and the number of attempts of full blind decoding. The CCE aggregation levels are four types of {1, 2, 4, 8}.

TABLE 4

| # of CCEs | Full Blind Decoding |
|---|---|
| 4 | 7 |
| 9 | 16 |
| 10 | 18 |
| 13 | 23 |
| 19 | 34 |

First, in case of four CCEs, full blind decoding is performed four times when the CCE aggregation level is 1, two times when the CCE aggregation level is 2, and one time when the CCE aggregation level is 4, so the number of attempts of full blind decoding totals 7. Second, in case of nine CCEs, full blind decoding is performed nine times when the CCE aggregation level is 1, four times when the CCE aggregation level is 2, and two times when the CCE aggregation level is 4, and one time when the CCE aggregation level is 8, so the number of attempts of full blind decoding totals 16. Third, in case of ten CCEs, full blind decoding is performed ten times when the CCE aggregation level is 1, five times when the CCE aggregation level is 2, two times when the CCE aggregation level is 4, and one time when the CCE aggregation level is 8, so the number of attempts of full blind decoding totals 18. Fourth, in case of thirteen CCEs, full blind decoding is performed thirteen times when the CCE aggregation level is 1, six times when the CCE aggregation level is 2, three times when the CCE aggregation level is 4, and one time when the CCE aggregation level is 8, so the number of attempts of full blind decoding totals 23. Fifth, in case of nineteen CCEs, full blind decoding is performed nineteen times when the CCE aggregation level is 1, nine times when the CCE aggregation level is 2, four times when the CCE aggregation level is 4, and two times when the CCE aggregation level is 8, so the number of attempts of full blind decoding totals 34.

Table 5 below shows examples of the number of CCEs, the number of attempts of full blind decoding, and the number (N_BDA_i) of limits of blind decoding of each CCE aggregation level (i). The examples are based on a case in which full blind decoding is performed on a given number of CCEs and a case in which blind decoding is performed by the number (N_BDA_i) of limits of blind decoding starting from a starting location of the UE-specific search space by using the UE-specific search space. The CCE aggregation levels are four types of {1, 2, 4, 8}.

gation level (i). For example, this happens when the CCE number is 4 and the CCE aggregation levels are 1, 2, 4, 8. This happens when the CCE number is 9 and the CCE aggregation levels are 2, 8. This happens when the CCE number is 10 and the CCE aggregation levels are 2, 8. This happens when the CCE number is 13 and the CCE aggregation level is 8. In these cases, performing of blind decoding by using the UE-specific search space is meaningless. Thus, the UE-specific search space may be switched off and full blind decoding may be performed. Also, only when the number of attempts of full blind decoding on the entire CCEs is greater than number (N_BDA_i) of limits of blind decoding in each CCE aggregation level (i), blind decoding based on the hashing function is performed by using the UE-specific search space.

Namely, the number (N_BDA_i) of limits of blind decoding in the UE-specific search space is set to be X. When the number of attempts of full blind decoding on the number of CCEs is X or smaller, full blind decoding is performed. If the number of attempts of blind decoding on the number of CCEs exceeds X, blind decoding based on the hashing function is performed. In a different method, a maximum number of CCEs is set to be Y in all the cases in which the number of attempts of full blind decoding is X or smaller. When the number of CCEs is Y or smaller, full blind decoding is performed regardless of the number of attempts full blind decoding.

The threshold value $P_i$ of the number of initial starting points, the reference for switching on or off the UE-specific search space, may be set based on the number (N_BDA_i) of limits of blind decoding. For example, the threshold value $P_i$ of the initial starting points may be set to be equal to the number (N_BDA_i) of limits of blind decoding. In case of Table 5, it may be set as follows: $P_1=6, P_2=6, P_4=2, P_8=2$.

Hereinafter, an algorithm with respect to switching on or off of a common search space or a UE-specific search space in the presence of the common search space and the UE-specific search space will now be described.

The total number of CCEs, the size of the CCE set, within a subframe is $N_{CCE}$. CCEs are index-numbered from 0 to $N_{CCE}-1$. It is assumed that a starting location of the common search space on the logical CCE set, namely, the total number of CCEs, is the first of the CCEs and the starting location of the UE-specific search space is $N_C$. Namely, the $N_C$ number of CCEs are allocated to the common search space and the other remaining CCEs are allocated to the UE-specific search space. The total number ($N_{CCE}$) of the CCEs may be divided into the following three ranges:

(1) $N_{CCE} < N_C + N_{agg}$

Here, $N_{agg}$ is a CCE aggregation level.

In this case, the total number of CCEs ($N_{CCE}$) is smaller than the sum of the number of CCEs allocated to the common

TABLE 5

| # of CCEs | Full blind decoding | i = 1<br>N_BDA_1 = 6 | i = 2<br>N_BDA_2 = 6 | i = 4<br>N_BDA_4 = 2 | i = 8<br>N_BDA_8 = 2 |
|---|---|---|---|---|---|
| 4 | 7 | 4 | 2 | 1 | 0 |
| 9 | 16 | 9 | 4 | 2 | 1 |
| 10 | 18 | 10 | 5 | 2 | 1 |
| 13 | 23 | 13 | 6 | 3 | 1 |

It is noted that the numbers of limits of blind decoding are set to be 6 or 2 for each of the CCE aggregation levels. In this case, it may happen that the number of attempts of full blind decoding on the entire CCEs is smaller than the number (N_BDA_i) of limits of blind decoding in each CCE aggresearch space ($N_C$) and the CCE aggregation level ($N_{agg}$). In this case, the number of CCEs ($N_{CCE}-N_C$) allocated to the UE-specific search space is smaller than the CCE aggregation level. Also, the total number of attempts of blind decoding is equal to the number of attempts blind decoding of the common search space. Namely, the UE-specific search space is meaningless. Thus, the BS arbitrarily maps all the control channels to the entire CCE column, rather than defining the common search space and the UE-specific search space. The UE performs blind decoding on the entire CCE column in order to receive control channels.

(2) $N_C+N_{agg}<N_{CCE}<N_C+N_{agg}+N\_BDA\_i*N_{agg}$

In this case, the total number of attempts of blind decoding is smaller than the sum of the number of attempts of blind decoding on the common search space and the number (N_BDA_i) of limits of blind decoding. Then, the advantage of the UE-specific search space cannot be used. Thus, the UE-specific search space is switched off.

In this case, the BS may arbitrarily map all the control channels to the entire CCE column, rather than defining the common search space and the UE-specific search space. The UE performs blind decoding on the entire CCE column in order to receive control channels.

Otherwise, unlike (1), the BS may separately set the common search space to limit a blind decoding area with respect to a control channel of a particular purpose.

(3) $N_C+N_{agg}+N\_BDA\_i*N_{agg}<N_{CCE}$

In this case, a common search space and a UE-specific search space are separately set.

The method of switching on and off the common search space and the UE-specific search space in the respective conditions described in (1) to (3) can be independently operated by the CCE aggregation levels. Or, the method of switching on and off the common search space and the UE-specific search space may be applied to the entire or a portion of the CCE aggregation levels based on different conditions.

Figure 16:
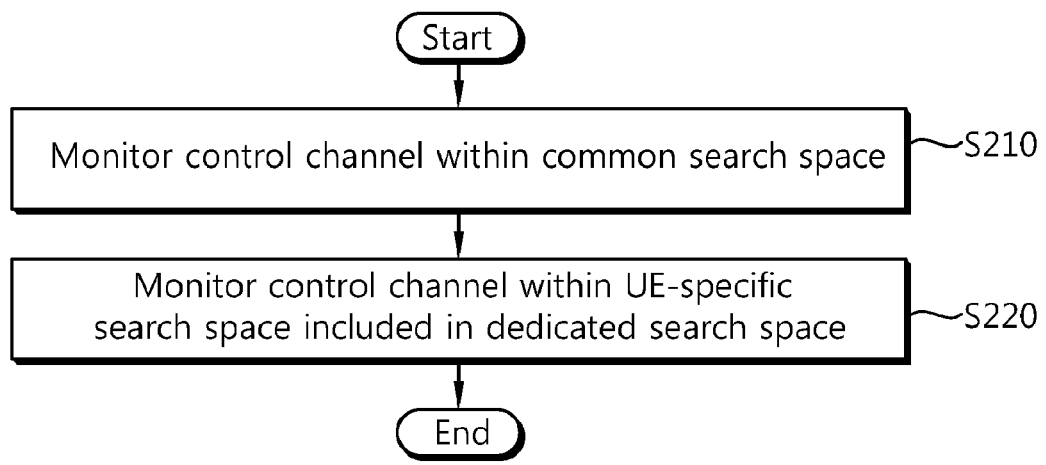
FIG. 16 is a flow chart illustrating the process of a method for monitoring a control channel in a wireless communication system according to an exemplary embodiment of the present invention.

FIG. 16 is a flow chart illustrating the process of a method for monitoring a control channel in a wireless communication system according to an exemplary embodiment of the present invention. This method is performed by a UE.

With reference to FIG. 16, the UE monitors a control channel within a common search space (S210). The UE monitors a control channel within a UE-specific search space included in a dedicated search space (S220). The common search space is a search space monitored by every UE within a cell, and the UE-specific search space is a search space monitored by at least one UE within the cell. The dedicated search space includes at least one UE-specific search space. A control region of a subframe is divided into a common search space having a variable size, and a dedicated search space having a variable size.

The common search space and the dedicated search space may be divided such that they do not overlap. The control region includes a plurality of contiguous CCEs, and the size of the common search space and that of the dedicated search space may vary as the number of CCEs included therein changes. The size of the common search space and that of the dedicated search space in the control region may vary depending on a blocking probability in which UE-specific search spaces of the plurality of UEs overlap in the dedicated search space. For example, when the blocking probability is greater than a threshold value, the size of the common search space may be reduced and the size of the dedicated search space may be increased. The threshold value may vary depending on the amount of radio resources allocated to the control region.

Figure 17:
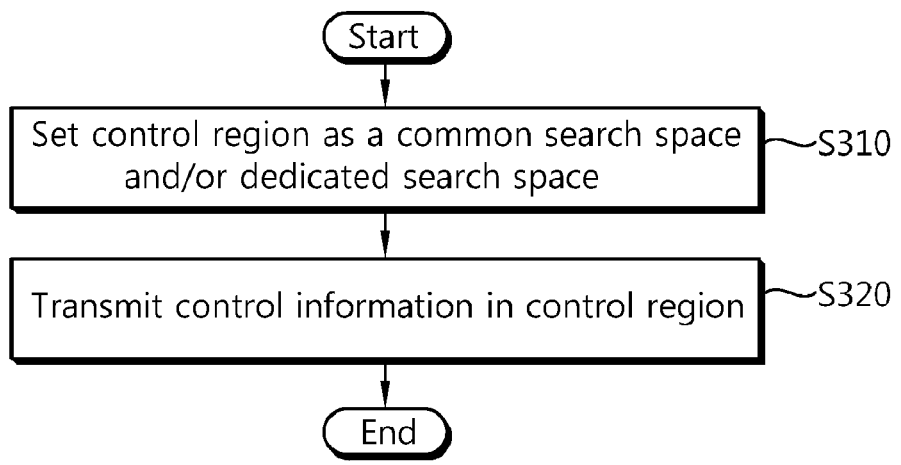
FIG. 17 is a flow chart illustrating the process of a method for monitoring a control channel in a wireless communication system according to another exemplary embodiment of the present invention.

FIG. 17 is a flow chart illustrating the process of a method for monitoring a control channel in a wireless communication system according to another exemplary embodiment of the present invention. This method is performed by a BS.

With reference to FIG. 17, the BS sets a control region as a common search space and/or a dedicated search space (S310). The BS transmits control information in the control region (S320). The BS divides the control region of a subframe into a common search space and a dedicated search space and sets accordingly, or sets the control region of the subframe only as a common search space or a dedicated search space, according to a blocking probability. When the blocking probability is greater than a threshold value, the BS may set the control region only as a dedicated search space.

Figure 18:
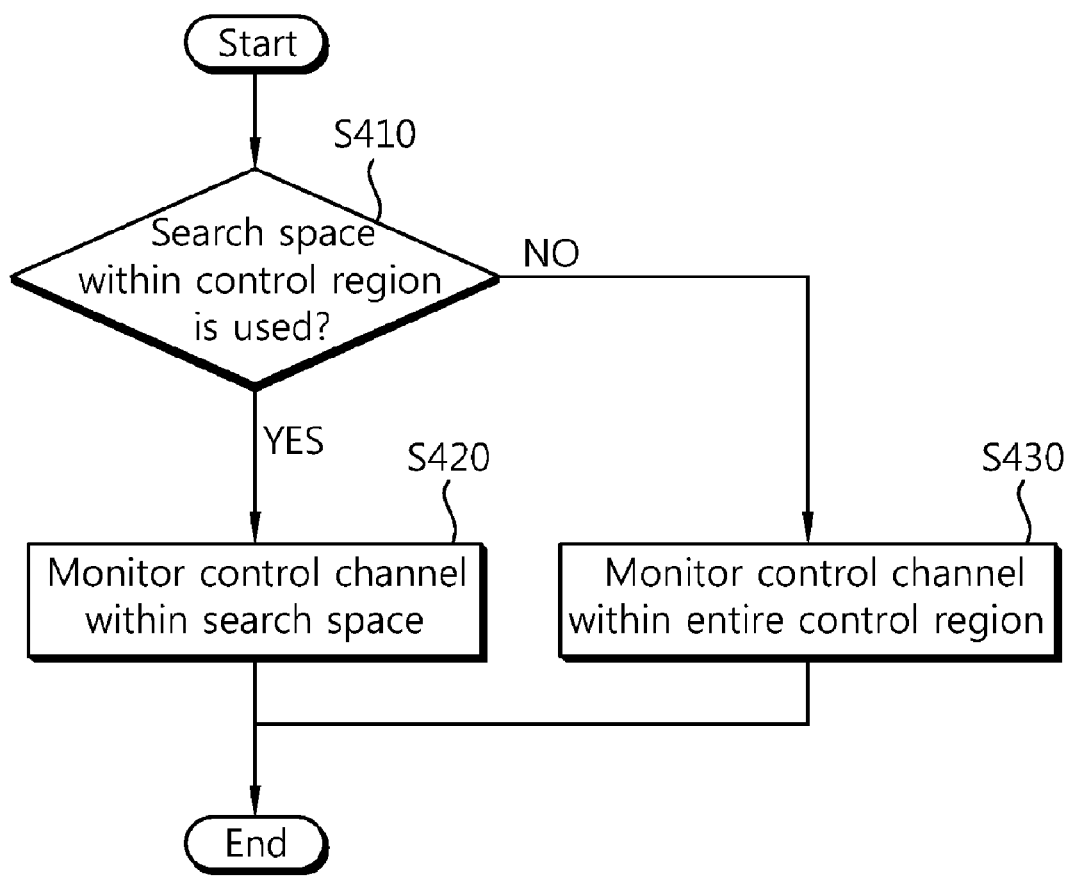
FIG. 18 is a flow chart illustrating the process of a method for monitoring a control channel in a wireless communication system according to still another exemplary embodiment of the present invention.

FIG. 18 is a flow chart illustrating the process of a method for monitoring a control channel in a wireless communication system according to still another exemplary embodiment of the present invention. This method is performed by the UE.

With reference to FIG. 18, the UE determines whether to use a search space to monitor a control channel in a control region of a subframe (S410). Whether to use a search space may be determined according to the amount of radio resources allocated to the control region. Or, the UE may receive information regarding whether to use a search space from the BS. When a search space is used, the UE monitors a control channel in the search space (S420). When the search space is not used, the UE monitors the control channel within the entire control region (S430).

Figure 19:
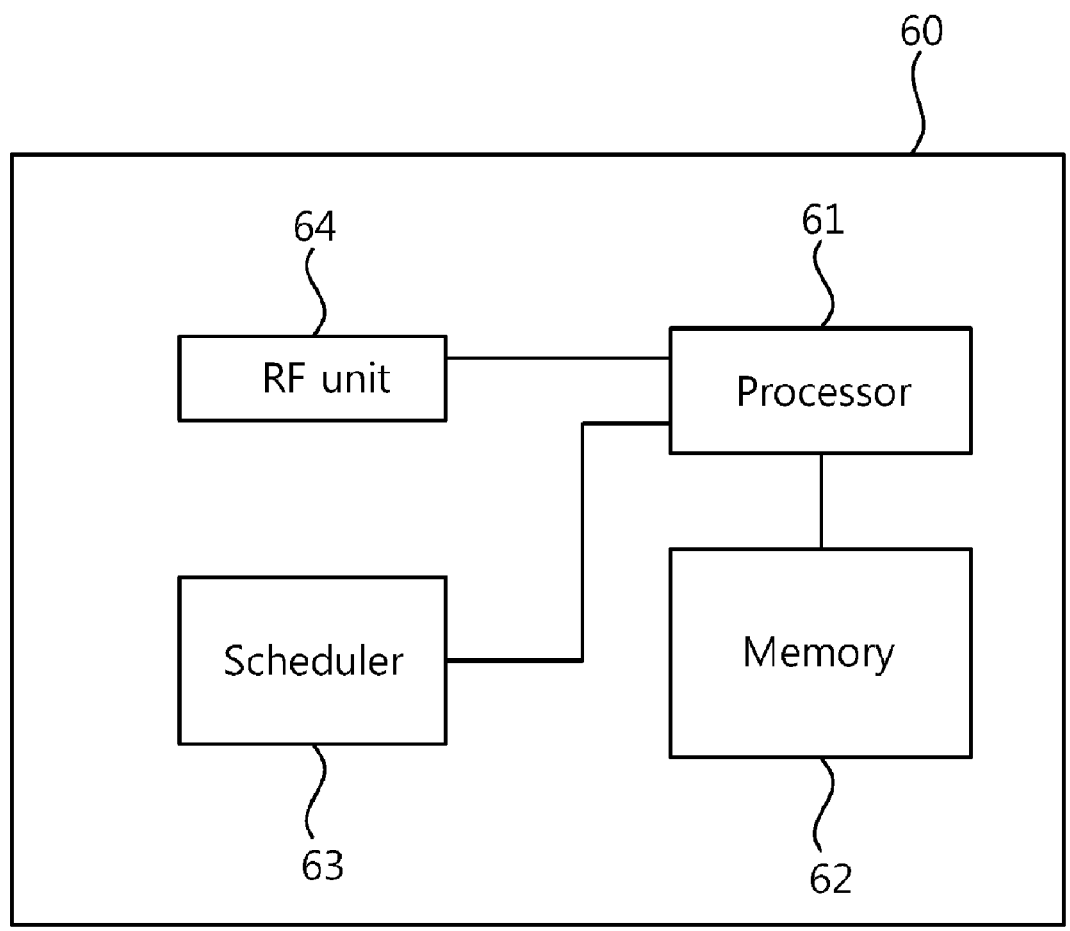
FIG. 19 is a schematic block diagram of a base station.

FIG. 19 is a schematic block diagram of a BS. The BS 60 includes a processor 61, a memory 62, a scheduler 63, and an RF unit 64. The RF unit 64 is connected to the processor 61 to transmit and/or receive a radio signal. The processor 61 may perform all the methods regarding the transmission of control information as described above. The memory 62 is connected to the processor 61 to store information processed by the processor 61. The scheduler 63 is connected to the processor 61 to perform all the methods regarding scheduling for transmission of control information as described above.

As described above, the UE can effectively monitor a PDCCH. Also, the BS can effectively multiplex a plurality of PDCCHs carrying control information regarding a plurality of UEs and transmit the same. Accordingly, the number of detection attempts according to blind decoding for monitoring the PDCCHs can be reduced. Overhead due to blind decoding can be reduced, and time taken for the UE to find a PDCCH required by the UE can be reduced. Power consumption of a battery of the UE can be reduced, and the performance of the overall system can be improved.

All the foregoing functions can be performed by processors such as a microprocessor, a controller, a microcontroller, an ASIC (Application Specific Integrated Circuit) according to software coded to perform the functions or program codes. Designing, development, and implementation of the codes may be obvious to the skilled person in the art based on the description of the present invention.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

The invention claimed is:

1. A method for monitoring a control channel in a wireless communication system, the method comprising:

dividing, by a device, a control region of a subframe into a common search space having a variable size and monitored by every user equipment (UE) within a cell and a dedicated search space having a variable size and including at least one UE-specific search space to be monitored by at least one UE within the cell, and monitoring a control channel within the common search space; and monitoring a control channel within the UE-specific search space included in the dedicated search space.

2. The method of claim 1, wherein the common search space and the dedicated search space do not overlap with each other.

3. The method of claim 1, wherein the control region comprises a plurality of contiguous control channel elements (CCEs), and the size of the common search space and that of the dedicated search space vary depending on the number of CCEs included in the common search space and the dedicated search space.

4. The method of claim 1, wherein the size of the common search space and that of the dedicated search space within the control region varies depending on a blocking probability that the UE-specific search spaces of the plurality of UEs will overlap within the dedicated search space.

5. The method of claim 4, wherein when the blocking probability is greater than a threshold value, the size of the common search space is reduced and the size of the dedicated search space is increased.

6. The method of claim 5, wherein the threshold value varies depending on the amount of radio resources allocated to the control region.

7. A method for transmitting downlink control information in a wireless communication system, the method comprising:
dividing, by a device, a control region of a subframe into a common search space and a dedicated search space to set the common search and the dedicated search space, or setting, by the device, the control region of the subframe entirely as a common search space or a dedicated search space, according to a blocking probability that UE-specific search spaces of a plurality of UEs overlap with each other within a dedicated search space; and
transmitting downlink control information on a downlink control channel within the common search space and the dedicated search space in the control region.

8. The method of claim 7, wherein when the blocking probability is greater than a threshold value, the control region is set only as the dedicated search space.

* * * * *